United States Patent
Leonard et al.

(10) Patent No.: US 10,508,703 B2
(45) Date of Patent: Dec. 17, 2019

(54) LATERAL SUPPORT ELEMENTS, GAS SPRING ASSEMBLIES, SUSPENSION SYSTEMS AND METHODS

(71) Applicant: Firestone Industrial Products Company, LLC, Nashville, TN (US)

(72) Inventors: Joshua R. Leonard, Noblesville, IN (US); Matthew F. Byron, Indianapolis, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/542,733

(22) PCT Filed: Jan. 12, 2016

(86) PCT No.: PCT/US2016/013001
§ 371 (c)(1),
(2) Date: Jul. 11, 2017

(87) PCT Pub. No.: WO2016/115103
PCT Pub. Date: Jul. 21, 2016

(65) Prior Publication Data
US 2018/0010664 A1      Jan. 11, 2018

Related U.S. Application Data

(60) Provisional application No. 62/102,559, filed on Jan. 12, 2015, provisional application No. 62/126,301, filed on Feb. 27, 2015.

(51) Int. Cl.
*F16F 9/05* (2006.01)
*F16F 9/04* (2006.01)
(Continued)

(52) U.S. Cl.
CPC .................. *F16F 9/05* (2013.01); *B61F 5/10* (2013.01); *F16F 9/0409* (2013.01);
(Continued)

(58) Field of Classification Search
CPC ... F16F 9/04; F16F 9/052; F16F 9/057; B60G 11/27; B60G 15/12; B60G 17/0521
(Continued)

(56) References Cited

U.S. PATENT DOCUMENTS 1,414,623 A * 5/1922 Church ................ F16F 9/0472
267/32
2,933,308 A * 4/1960 McGavern, Jr. ....... B60G 11/27
267/256
(Continued)

FOREIGN PATENT DOCUMENTS

CN     103 883 659      6/2014
DE        4018712   * 12/1991  ............... F16F 9/08
(Continued)

OTHER PUBLICATIONS

International Search Report and Written Opinion for corresponding PCT application No. PCT/US2016/013001 dated Apr. 14, 2016.

*Primary Examiner* — Christopher P Schwartz
(74) *Attorney, Agent, or Firm* — Brian D. McAlhaney; Matthew P. Dugan

(57) ABSTRACT

Lateral support elements include an element wall with an exterior surface dimensioned to abuttingly engage an associated flexible wall and an interior surface that at least partially defines an element chamber within the lateral supporting element. Gas spring assemblies include a flexible spring member that at least partially defines a spring chamber. The lateral support element is disposed along and operatively connected to the flexible spring member. The element chamber can, optionally and in some cases, be
(Continued)

disposed in fluid communication with the spring chamber. The gas spring assembly can include one or more end members operatively connected to the flexible spring member. Suspension systems and methods of assembly are also included.

20 Claims, 13 Drawing Sheets

(51) Int. Cl.
*B61F 5/10* (2006.01)
*F16F 9/32* (2006.01)
*F16F 9/43* (2006.01)

(52) U.S. Cl.
CPC .......... *F16F 9/0454* (2013.01); *F16F 9/0472* (2013.01); *F16F 9/32* (2013.01); *F16F 9/3207* (2013.01); *F16F 9/43* (2013.01); *F16F 2222/126* (2013.01); *F16F 2226/04* (2013.01)

(58) Field of Classification Search
USPC ............. 188/298; 267/35, 64.19–64.27, 122; 280/124.157, 124.161
See application file for complete search history.

(56) References Cited

U.S. PATENT DOCUMENTS

| | | | | |
|---|---|---|---|---|
| 3,627,297 A * | 12/1971 | Gaydecki | ................ | F16F 9/049 267/118 |
| 4,148,501 A * | 4/1979 | McKee | ................... | B60G 11/27 267/64.11 |
| 4,504,044 A * | 3/1985 | Shtarkman | ............... | F16F 13/00 188/268 |
| 4,506,910 A * | 3/1985 | Bierens | ................... | B60G 11/27 267/64.21 |
| 4,629,170 A * | 12/1986 | Warmuth, II | ........... | F16F 9/049 267/64.21 |
| 4,659,070 A * | 4/1987 | Buma | .................... | B60G 11/30 267/64.25 |
| 8,511,652 B2 * | 8/2013 | Moulik | .................. | B60G 15/14 267/122 |
| 8,540,220 B2 * | 9/2013 | Sawa | ........................ | B61F 5/10 267/3 |
| 9,061,689 B2 * | 6/2015 | Fujimoto | .................. | B61F 5/02 |
| 9,759,282 B2 * | 9/2017 | Ura | ............................ | F16F 9/04 |
| 10,138,972 B2 * | 11/2018 | Haraguchi | ................ | B61F 5/10 |
| 2010/0096786 A1 | 4/2010 | Orlamunder | | |
| 2013/0300074 A1 * | 11/2013 | Koeske | .................. | B60G 11/27 280/6.157 |
| 2014/0091506 A1 * | 4/2014 | Nieten | ................... | B60G 11/27 267/64.27 |
| 2014/0191487 A1 * | 7/2014 | Sachan | .................. | B60G 11/27 280/124.157 |
| 2014/0230687 A1 * | 8/2014 | Jackson, Jr. | .............. | B61F 5/10 105/198.1 |
| 2014/0300038 A1 * | 10/2014 | Kita | ......................... | F16F 9/05 267/122 |
| 2015/0165853 A1 * | 6/2015 | Smith | .................... | B60G 11/62 105/453 |
| 2015/0167772 A1 * | 6/2015 | Street | .................... | F16F 9/0454 267/64.27 |
| 2016/0121682 A1 * | 5/2016 | Leonard | .................... | F16F 9/04 280/124.161 |
| 2016/0186829 A1 * | 6/2016 | Coakley | .................. | F16F 9/003 152/520 |

FOREIGN PATENT DOCUMENTS

| | | |
|---|---|---|
| WO | WO 2012/052776 | 4/2012 |
| WO | WO 2015/125365 | 8/2015 |

* cited by examiner

LATERAL SUPPORT ELEMENTS, GAS SPRING ASSEMBLIES, SUSPENSION SYSTEMS AND METHODS

This application is a National Stage of International Application No. PCT/US2016/013001, filed on Jan. 12, 2016, which claims the benefit of priority from U.S. Provisional Patent Application No. 62/102,559, filed on Jan. 12, 2015, and from U.S. Provisional Patent Application No. 62/126,301, filed on Feb. 27, 2015, the subject matter of each of which is hereby incorporated herein by reference in its entirety.

BACKGROUND

The subject matter of the present disclosure broadly relates to the art of spring devices and, more particularly, to lateral support elements that include one or more internal volumes and are dimensioned for use in forming gas spring assemblies. Additionally, gas spring assemblies including such lateral support elements as well as suspension systems for vehicles that include one or more of such gas spring assemblies as well as methods of assembly are included.

The subject matter of the present disclosure is capable of broad application and use in connection with a variety of applications and/or environments. However, the subject matter finds particular application and use in conjunction with rail vehicles, and will be described herein with particular reference thereto. However, it is to be appreciated that the subject matter of the present disclosure is amenable to use in connection with other applications and environments.

A suspension system, such as may be used in connection with motorized rail vehicles and/or rolling-stock rail vehicles, for example, can include one or more spring elements for accommodating forces and loads associated with the operation and use of the corresponding device (e.g., a rail vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Generally, vehicle performance characteristics, such as ride quality and comfort, are commonly identified as being related to factors, such as spring rate, that are acting in an approximately axial direction in relation to the gas spring assemblies. It has been recognized, however, that relative movement in the lateral direction (i.e., a direction transverse to the axes of the gas spring assemblies) can also influence vehicle performance characteristics, such as ride quality and comfort, for example. In some cases, such lateral movement can include movement of the opposing end members of a gas spring assembly relative to one another in a direction transverse (e.g., perpendicular) to the axis of the gas spring assembly that is formed between the opposing end members.

Notwithstanding the widespread usage and overall success of the wide variety of gas spring assemblies including a lateral support element that are known in the art, it is believed that a need exists to meet these competing goals while still retaining comparable or improved performance, ease of manufacture, ease of assembly, ease of installation, reduced cost of manufacture, and/or otherwise advancing the art of spring devices.

BRIEF SUMMARY

One example of a lateral support element in accordance with the subject matter of the present disclosure is dimensioned for use along an associated end of an associated flexible wall to at least partially form an associated gas spring assembly. The lateral support element can include an element wall with an exterior surface dimensioned to abuttingly engage the associated flexible wall along the associated end thereof. The element wall also includes an interior surface that at least partially defines an element chamber within the lateral support element.

One example of a gas spring assembly in accordance with the subject matter of the present disclosure can include a flexible wall having a longitudinal axis and extending peripherally about the longitudinal axis between opposing ends that are spaced longitudinally from one another. The flexible wall can include an inner surface and an outer surface with the inner surface at least partially defining a spring chamber. A lateral support element can be supported along one of the ends of the flexible wall. The lateral support element can include an element wall with an exterior surface dimensioned to abuttingly engage the flexible wall and an interior surface that at least partially defines an element chamber within the lateral support element.

In some cases, a gas spring assembly according to the foregoing paragraph can include another lateral support element supported along the other one of the ends of the flexible wall. The lateral support element can include an element wall with an exterior surface dimensioned to abuttingly engage the flexible wall. And, the lateral support element can optionally include an interior surface that at least partially defines an element chamber within the lateral support element.

In some cases, a gas spring assembly according to either one of the two foregoing paragraphs can include the flexible wall being at least partially formed from an elastomeric material, and the lateral support element being at least partially embedded within the elastomeric material of the flexible wall.

In some cases, a gas spring assembly according to any one of the three foregoing paragraphs can include a passage extending through the element wall such that the spring chamber and the element chamber are disposed in fluid communication with one another. In some cases, the passage can extend through the element wall and the flexible wall.

In some cases, a gas spring assembly according to any one of the four foregoing paragraphs can include a quantity of adsorptive material disposed within the element chamber of the lateral support element.

One example of a suspension system in accordance with the subject matter of the present disclosure can include a pressurized gas system that includes a pressurized gas source and a control device. The suspension system can also include at least one gas spring assembly according to any one of the five foregoing paragraphs. The at least one gas spring assembly can be disposed in fluid communication with the pressurized gas source through the control device such that pressurized gas can be selectively transferred into and out of at least the spring chamber of the at least one gas spring assembly.

One example of a method of assembling a gas spring assembly in accordance with the subject matter of the present disclosure can include providing a flexible wall having a longitudinal axis and extending peripherally about the longitudinal axis between opposing ends to at least partially form a spring chamber. The method can also include providing a lateral support element having an element wall with an exterior surface and an interior surface that at least partially defines an element chamber within the lateral support element. The method can further include positioning the lateral support element on or along the flexible wall adjacent one of the ends thereof. The method can also include providing a first end member and securing a first end of the flexible wall on or along the first end member. The method can also, optionally, include providing a second end member and securing the second end member on or along an end of the flexible wall to at least partially form a spring chamber.

In some cases, a method according to the foregoing paragraph can include providing another lateral support element having an element wall with an exterior surface. The method can further include positioning the lateral support element on or along the flexible wall adjacent the other one of the ends thereof.

In some cases, a method according to the foregoing paragraph can include the element wall of the another lateral support element including an interior surface that at least partially defines an element chamber within the lateral support element.

In some cases, a method according to any one of the three foregoing paragraphs can include operatively connecting the element chamber in fluid communication with the spring chamber such that pressurized gas transfer can transfer therebetween.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
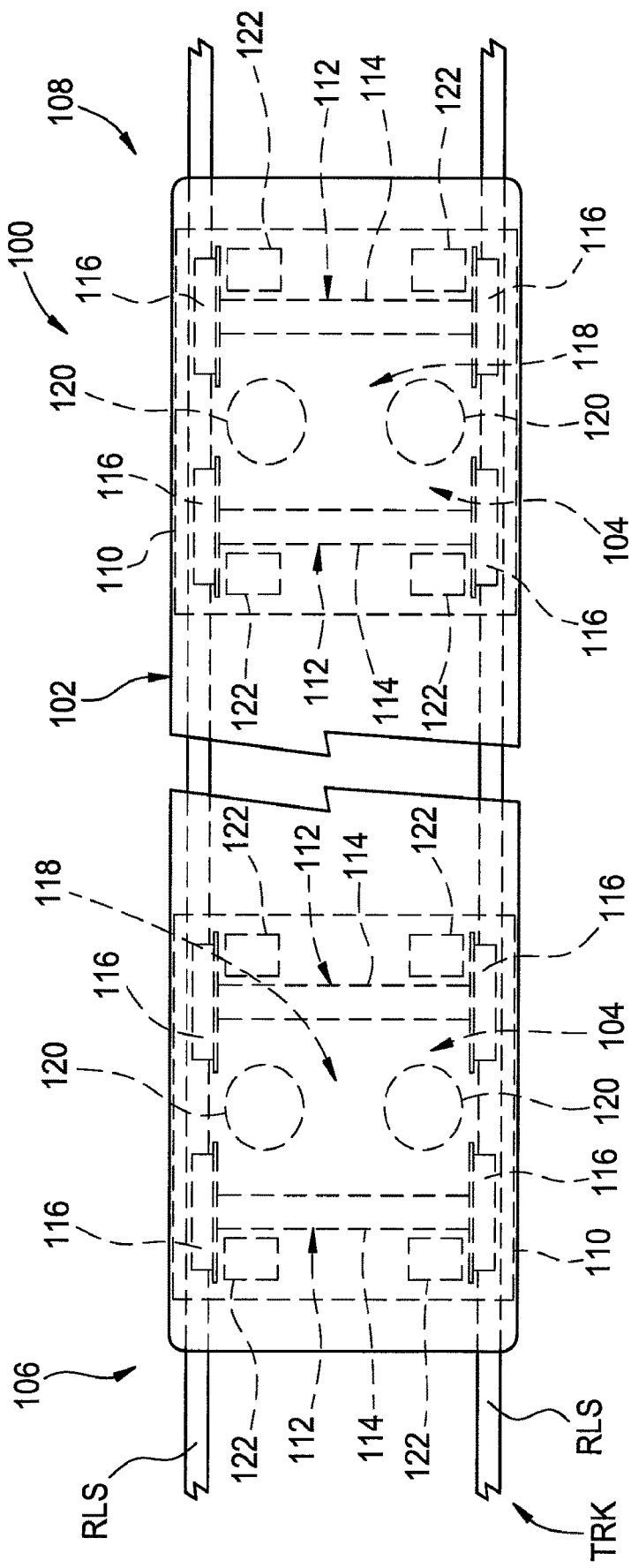
FIG. 1 is a schematic representation of one example of a rail vehicle including a suspension system in accordance with the subject matter of the present disclosure.

FIG. 1 illustrates one example of a vehicle including a suspension system in accordance with the subject matter of the present disclosure, such as a vehicle 100 that is adapted for movement or otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction-drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1 and 2, bogies 104 include two gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
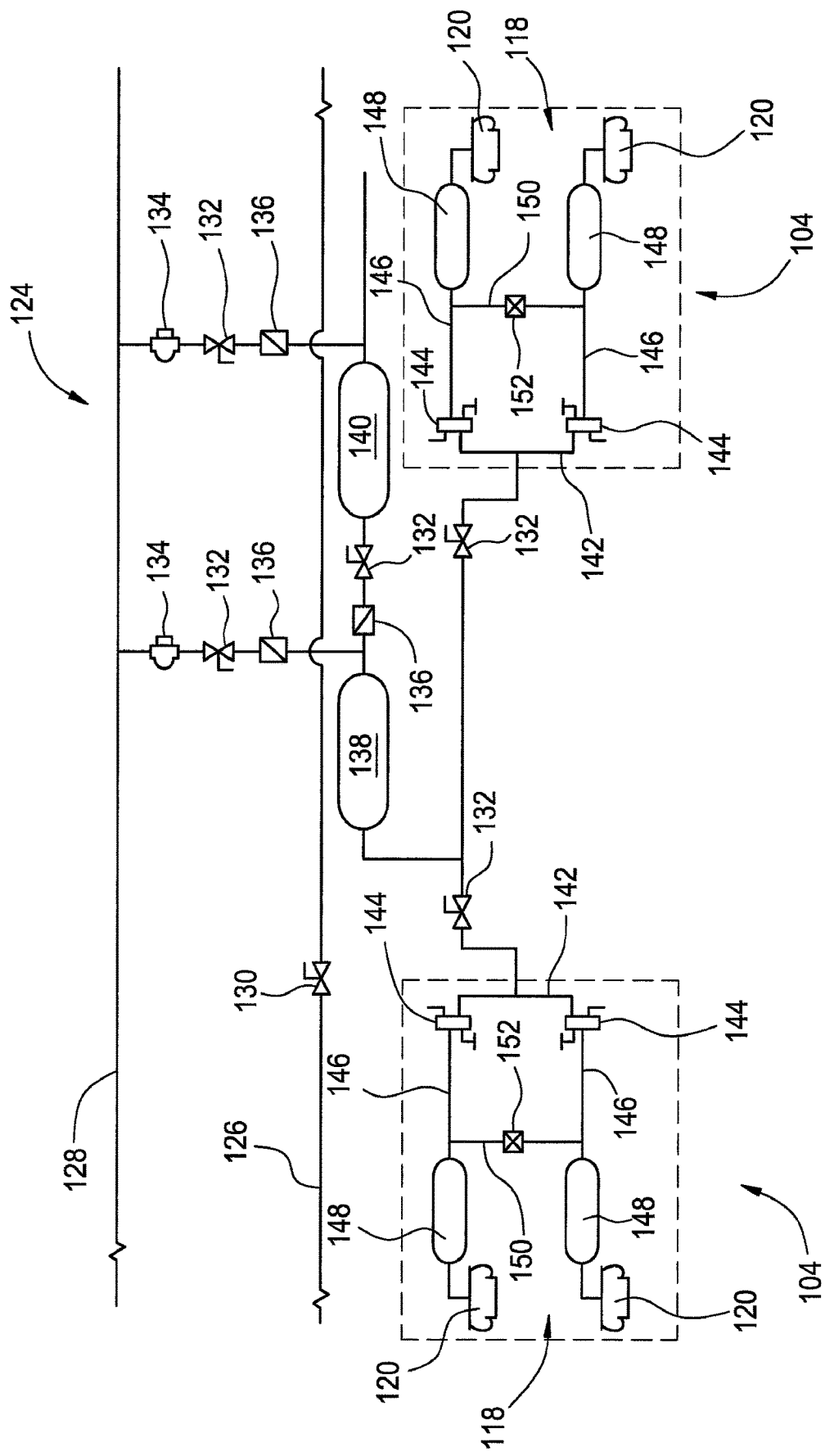
FIG. 2 is a schematic representation of one example of a pneumatic gas system operatively associated with the suspension system in FIG. 1.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

A gas spring assembly in accordance with the subject matter of the present disclosure can include one or more lateral support elements in accordance with the subject matter of the present disclosure. As such, it will be appreciated that a lateral support element in accordance with the subject matter of the present disclosure can be disposed on, along or otherwise operatively associated with either one of the ends of the flexible spring member of the gas spring assembly. In some cases, a lateral support element in accordance with the subject matter of the present disclosure can be disposed on, along or otherwise operatively associated with each end of the flexible spring member.

One example of a gas spring assembly in accordance with the subject matter of the present disclosure, such as may be suitable for use as one or more of gas spring assemblies 120 in FIGS. 1 and 2, for example, is shown as gas spring assembly 200 in FIGS. 3-6. The gas spring assembly has a longitudinal axis AX and includes an end member 202, an end member 204 spaced longitudinally from end member 202 and a flexible spring member or sleeve 206 that extends peripherally about the longitudinal axis and is secured between the end members to at least partially define a spring chamber 208.

Gas spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. In the arrangement shown in FIGS. 3-5, for example, end member 202 is secured on or along a structural component SC1, such as an associated vehicle body 102 in FIG. 1, for example, and can be secured thereon in any suitable manner. As another example, end member 204 is secured on or along a structural component SC2, such as an associated rail bogie 104 in FIG. 1, for example, and can be secured thereon in any suitable manner.

In the exemplary arrangement in FIGS. 3-6, end member 202 is shown as taking the form of a top plate having a plate wall 210 that has opposing surfaces 212 and 214 such that a plate height (not identified) is at least partially defined therebetween. Plate wall 210 is shown as being generally planar and extending outwardly to an outer periphery 216. In some cases, plate wall 210 can have a generally circular shape such that an outer peripheral surface 218 extending in a heightwise direction can have a generally cylindrical shape.

End member 202 can also include a side wall 220 that extends peripherally about axis AX. In a preferred arrangement, side wall 220 can be disposed radially inward of outer periphery 216 and projects axially outward from along surface 214 of plate wall 210 to a distal edge 222. It will be appreciated that side wall 220 can be of any suitable size, shape, form and/or configuration. For example, as identified in FIG. 6, side wall 220 can include approximately cylindrical inner and outer surfaces 224 and 226. Alternately, the side wall can have one or more surfaces that are frustoconical, curvilinear and/or otherwise contoured. In a preferred arrangement, at least a portion of outer surface 226 and at least a portion of surface 214 of plate wall 210 can form a mounting seat (not numbered) that extends peripherally about axis AX. Additionally, in a preferred arrangement, outer surface 226 can be dimensioned to receive and form a substantially fluid-tight connection with an end of flexible spring member 206.

In some cases, a retainment ridge 228 can extend peripherally about axis AX and can project radially outward from side wall 220. As identified in FIG. 6, retainment ridge 228 can include an outermost edge 230, a shoulder surface 232 and an outer surface 234. In a preferred arrangement, shoulder surface 232 can extend peripherally around axis AX and radially outwardly from along outer surface 226 of side wall 220 to outermost edge 230. Additionally, shoulder surface 232 is disposed in facing relation to surface 214 of plate wall 210 and extends radially outwardly in generally transverse relation to side wall 220. While shoulder surface 232 is shown as being substantially continuous, it will be appreciated that a discontinuous or segmented arrangement could alternately be used in which a plurality of peripherally-spaced shoulder portions are provided. Outer surface 234 can, in some cases, extend between and operatively connect outermost edge 230 and distal edge 222. It will be appreciated, however, that other configurations and/or arrangements could alternately be used.

A passage surface 236 can at least partially define a gas transfer passage 238 extending through end member 202 such that pressurized gas can be transferred into and out of spring chamber 208, such as by way of pneumatic system 124 (FIG. 2) for example. In some cases, the end member can include a projection or boss 240 that extends from along plate wall 210 in a longitudinal direction. In the exemplary arrangement shown in FIGS. 3-5, projection 240 extends axially outwardly away from spring chamber 208.

As mentioned above, one or more securement devices (not shown) can be used to secure or otherwise interconnect the end members of the gas spring assembly with corresponding structural components. In some cases, projection 240 can include an outer surface 242 that is dimensioned for receipt within a passage or mounting hole MHL that extends through structural component SC1. Additionally, one or more sealing elements 244 can, optionally, be included that are disposed between or otherwise at least partially form a substantially fluid-tight connection between the end member and the structural component, such as between projection 240 and mounting hole MHL, for example. In some cases, structural component SC1 can, optionally, at least partially define an external reservoir suitable for storing a quantity of pressurized gas.

End member 204 is shown as taking the form of an assembly that includes a support base or pedestal 246 and a base plate 248 that is secured on or along the pedestal in a suitable manner, such as by way of a flowed-material joint 250, for example. Pedestal 246 extends axially between opposing ends 252 and 254, and includes an outer surface 256 that extends peripherally about axis AX and an end surface 258 that is disposed along end 254 and is dimensioned or otherwise configured for operative engagement with an associated structural component, such as structural component SC2, for example. It will be appreciated that end member 204 can be secured on or along the associated structural component in any suitable manner. As one example, pedestal 246 can include a plurality of securement features 260, such as threaded passages that extend inwardly into the pedestal from along end surface 258, for example. In some cases, a corresponding number of one or more holes or passages HLS can extend through structural component SC2 that are dimensioned for receipt of a securement device 262, such as a threaded fastener, for example. It will be appreciated, however, that other configurations and/or arrangements could alternately be used.

Base plate 248 can have a plate wall 264 that has opposing surfaces 266 and 268 such that a plate height (not identified) is at least partially defined therebetween. Base plate 248 is shown as being generally planar and extending outwardly to an outer periphery 270. In some cases, base plate 248 can have a generally circular shape such that an outer peripheral surface 272 extending in a heightwise direction can have a generally cylindrical shape. Additionally, in some cases, base plate 248 can, optionally, include an endless annular recess or groove 274 that extends axially inwardly into the base plate from along surface 266 thereof. It will be appreciated that such a groove, if provided, can be of any suitable size, shape, configuration and/or arrangement. For example, groove 274 is shown as being at least partially defined by a bottom surface 276, an inner side surface 278 and an outer side surface 280. In a preferred arrangement, groove 274 can be dimensioned to at least partially receive a portion of flexible spring member 206 and one or more retaining elements, such as may be used to secure the flexible spring member on or along the base plate, for example.

Flexible spring member 206 can be of any suitable size, shape, construction and/or configuration. As one example, flexible spring member 206 can include a flexible wall 282 that extends in a longitudinal direction between opposing ends 284 and 286. It will be appreciated that flexible spring member 206 and flexible wall 282 thereof can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

As shown in FIGS. 3-7, for example, flexible wall 282 can include an outer surface 288 and an inner surface 290, which can at least partially define spring chamber 208. Additionally, as identified in FIGS. 5-7, flexible wall 282 can include an outer or cover ply 292 that at least partially forms outer surface 288 and an inner or liner ply 294 that at least partially forms inner surface 290. In a preferred arrangement, flexible wall 282 can also include one or more reinforcing plies disposed between outer and inner surfaces 288 and 290. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization or another curing process, for example.

Figure 5:
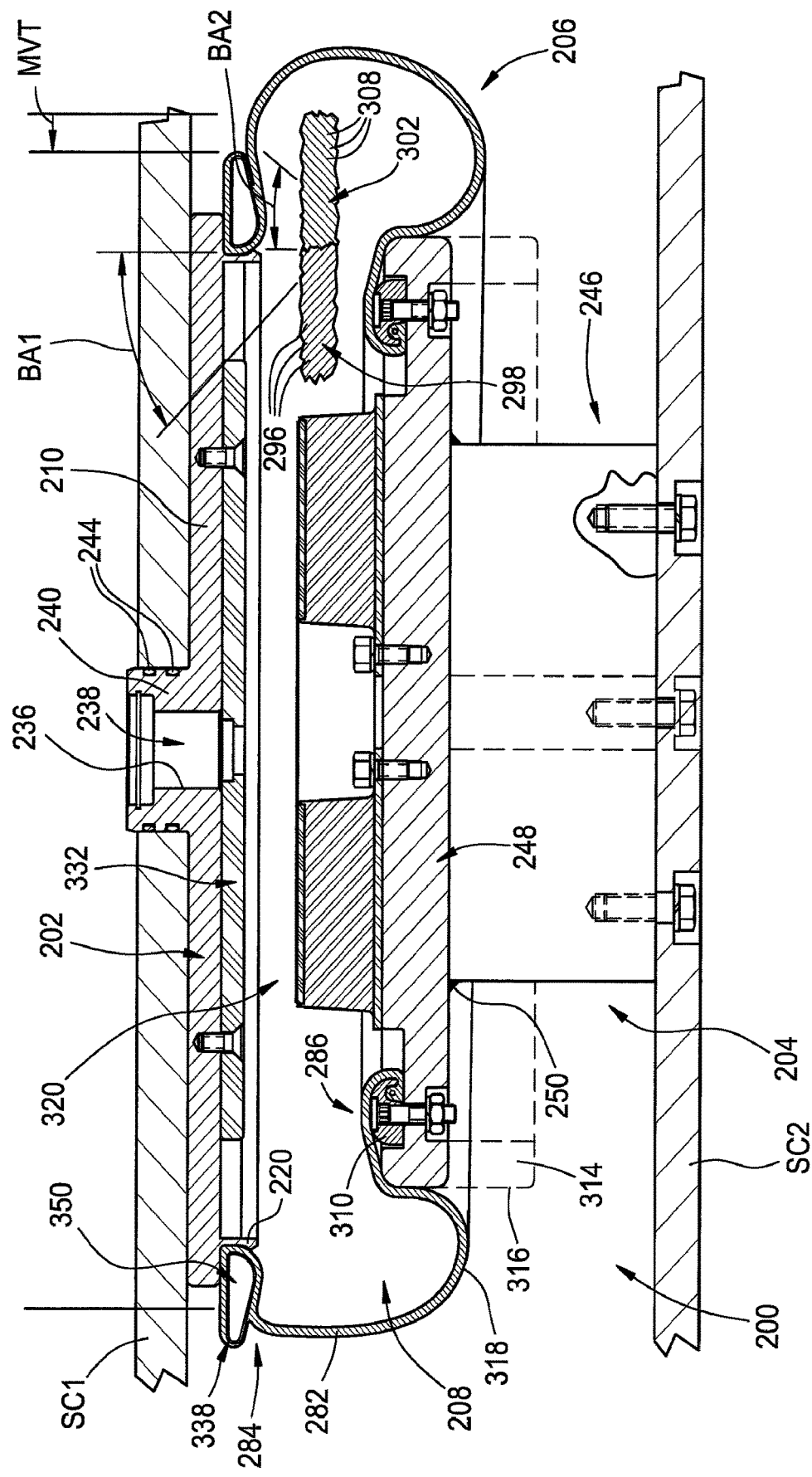
FIG. 5 illustrates the gas spring assembly in FIGS. 3 and 4 in a laterally displaced condition.

Additionally, it will be appreciated that the one or more lengths of filament material, if provided, can be oriented in any suitable manner. As one example, flexible wall 282 is shown in FIG. 5 as including a plurality of filament segments 296 of one reinforcing ply 298 disposed at one bias angle BA1 and a plurality of filament segments 300 of another reinforcing ply 302 disposed another bias angle BA2. It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 5 by reference dimensions BA1 and BA2, for example.

In some cases, flexible wall 282 can, optionally, include a mounting bead dispose along either one or both of ends 284 and 286. In the arrangement shown in FIGS. 4-7, mounting beads 304 and 306 are shown as being respectively disposed along ends 284 and 286. In some cases, one or more of the mounting beads can, optionally, include a reinforcing element, such as an endless, annular bead core 308, for example, that is at least partially embedded therein and is substantially inextensible in comparison with at least one or more materials of flexible wall 282.

It will be appreciated, that the ends of flexible spring member 206 can be secured on, along or otherwise interconnected between end members 202 and 204 in any suitable manner. As one example, gas spring assembly 200 can include one or more bead retaining elements that engage at least a portion of the flexible spring member and maintain the flexible spring member in substantially fluid-tight engagement with the corresponding end member (e.g., end member 204). In the arrangement shown in FIGS. 3-5, end 286 of flexible wall 282 is disposed in abutting engagement with bottom surface 276 of groove 274 in base plate 248. A bead retaining element 310, such as in the form of an endless, annular ring, for example, can capture at least a portion of mounting bead 306 and is shown as being secured on or along base plate 248 by way of a plurality of securement devices 312, such as, for example, threaded fastener (not numbered) and threaded nut (not numbered) combinations that extend through at least approximately aligned holes or slots (not numbered) in the base plate and in the bead retaining element.

Typically, at least a portion of flexible spring member 206 will extend radially outward beyond outer periphery 270 of base plate 248. In some cases, end member 204 can include an outer support wall 314 (FIG. 5) that can, optionally, extend peripherally around or otherwise along base plate 248, such as from along the plate wall of the base plate and in a direction toward end 254 of pedestal 246. In such cases, flexible spring member 206 can extend along an outer surface 316 (FIG. 5) of outer support wall 314 such that a rolling lobe 318 is formed along the flexible spring member. Outer surface 316 is shown in FIG. 5 as having a generally cylindrical shape, and rolling lobe 318 can be displaceable along the outer surface as the gas spring assembly is axially displaced between extended and compressed conditions, such as may occur during dynamic use in operation. It will be appreciated that other shapes and/or configurations of outer support wall 314 and/or outer surface 316 can alternately be used, such as may be useful to provide desired performance characteristics, for example.

Figure 4:
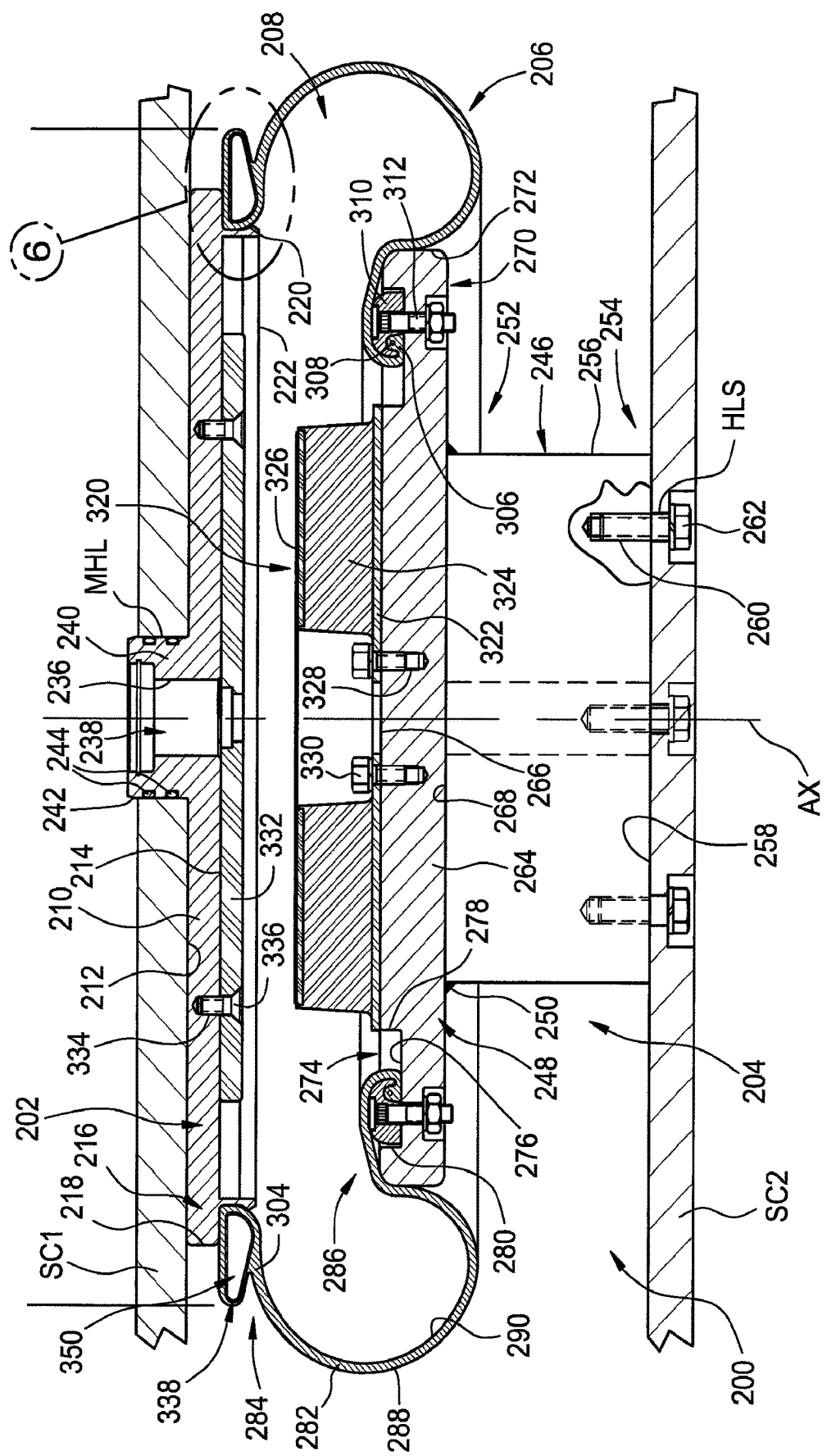
FIG. 4 is a cross-sectional side view of the gas spring assembly in FIG. 3 taken from along line 4-4 thereof.

As is well known in the art, it is generally desirable to avoid or at least minimize contact between end members of a gas spring assembly, such as may occur due to variations in load conditions and/or upon deflation of the gas spring assembly, for example. As such, gas spring assembly 200 is shown in FIGS. 4 and 5 as including a jounce bumper 320 that is disposed within spring chamber 208 and supported on end member 204. As identified in FIG. 5, jounce bumper 320 is shown as including a mounting plate 322 that is disposed in abutting engagement with end member 204, a bumper body 324 supported on the mounting plate, and a wear plate 326 that is supported on at least partially embedded within bumper body 324.

It will be appreciated that jounce bumper 320 can be secured on or along an end member in any suitable manner. As identified in FIG. 5, for example, base plate 248 of end member 204 is shown as including one or more securement features 328, such as may take the form of a plurality of threaded holes, for example. In such case, a corresponding number of one or more securement devices 330, such as one or more threaded fasteners, for example, can extend through one of a corresponding number of holes, openings or other features of the jounce bumper or a component thereof (e.g., mounting plate 322) to secure the jounce bumper on or along the end member.

Gas spring assembly 200 can also, optionally, include one or more additional components that may be dimensioned to or otherwise suitable for abuttingly engaging the jounce bumper or a component thereof (e.g., wear plate 326). In the arrangement shown in FIGS. 4 and 5, gas spring assembly 200 includes a bearing plate 332 that is disposed in abutting engagement along surface 214 of plate wall 210 and is secured on or along end member 202. It will be appreciated that the bearing plate can be attached to the end member in any suitable manner. For example, plate wall 210 of end member 202 can include one or more securement features 334, such as threaded holes, for example, that as may be suitable for receiving a complimentary securement device 336, such as a threaded fastener, for example, to secure the bearing plate on or along the end member.

As discussed above, it will be appreciated, that the ends of flexible spring member 206 can be secured on, along or otherwise interconnected between end members 202 and 204 in any suitable manner. As mentioned above, for example, gas spring assembly 200 can include one or more bead retaining elements that engage at least a portion of the flexible spring member and maintain the flexible spring member in substantially fluid-tight engagement with the corresponding end member (e.g., end member 202). In some cases, a bead retaining element, such as bead retaining element 310, for example, could be used. Alternately, one or more bead retaining features can be formed on or along another component of the gas spring assembly.

As another alternative, end 284 of flexible spring member 206 can be dimensioned for receipt and retention on or along side wall 220. In the arrangement shown in FIGS. 3-7, for example, mounting bead 304 is dimensioned to abuttingly engage outer surface 226 of side wall 220 such that a substantially fluid-tight seal can be formed therebetween. It will be appreciated that end 284 can be assembled onto end member 202 in any suitable manner. As one example, end 284 can be position adjacent distal edge 222 of side wall 220 and/or outer surface 234 of retainment ridge 228. End 284 of flexible wall 282 can then be urged, pressed or otherwise forced over the retainment ridge and into abutting engagement with one or more of surface 214 of plate wall 210 and/or outer surface 226 of side wall 220.

As shown in FIGS. 3-7, gas spring assembly 200 can also include a lateral support element that is operatively associated with flexible spring member 206 and at least one of end members 202 and 204. As discussed above, end 284 of flexible wall 282 can be secured on or along end member 202 in any suitable manner. For example, mounting bead 304 can, in some cases, include an annular reinforcing element, such as a bead core 308 in mounting bead 306, for example. In such cases, the lateral support element can be provided separately from flexible spring member 206, and can be secured on or along the end member and/or the flexible wall in a suitable manner, which can be separate and apart from the securement of at least end 284 of flexible spring member 206 on or along end member 202. In other cases, the lateral support element function as both a substantially-inextensible reinforcing element for a mounting bead of the flexible spring member as well as a structural feature for supporting, engaging or otherwise influencing the flexible spring member as the gas spring assembly undergoes lateral displacement (i.e., movement of the opposing end members relative to one another in a direction transverse to axis AX).

Figure 3:
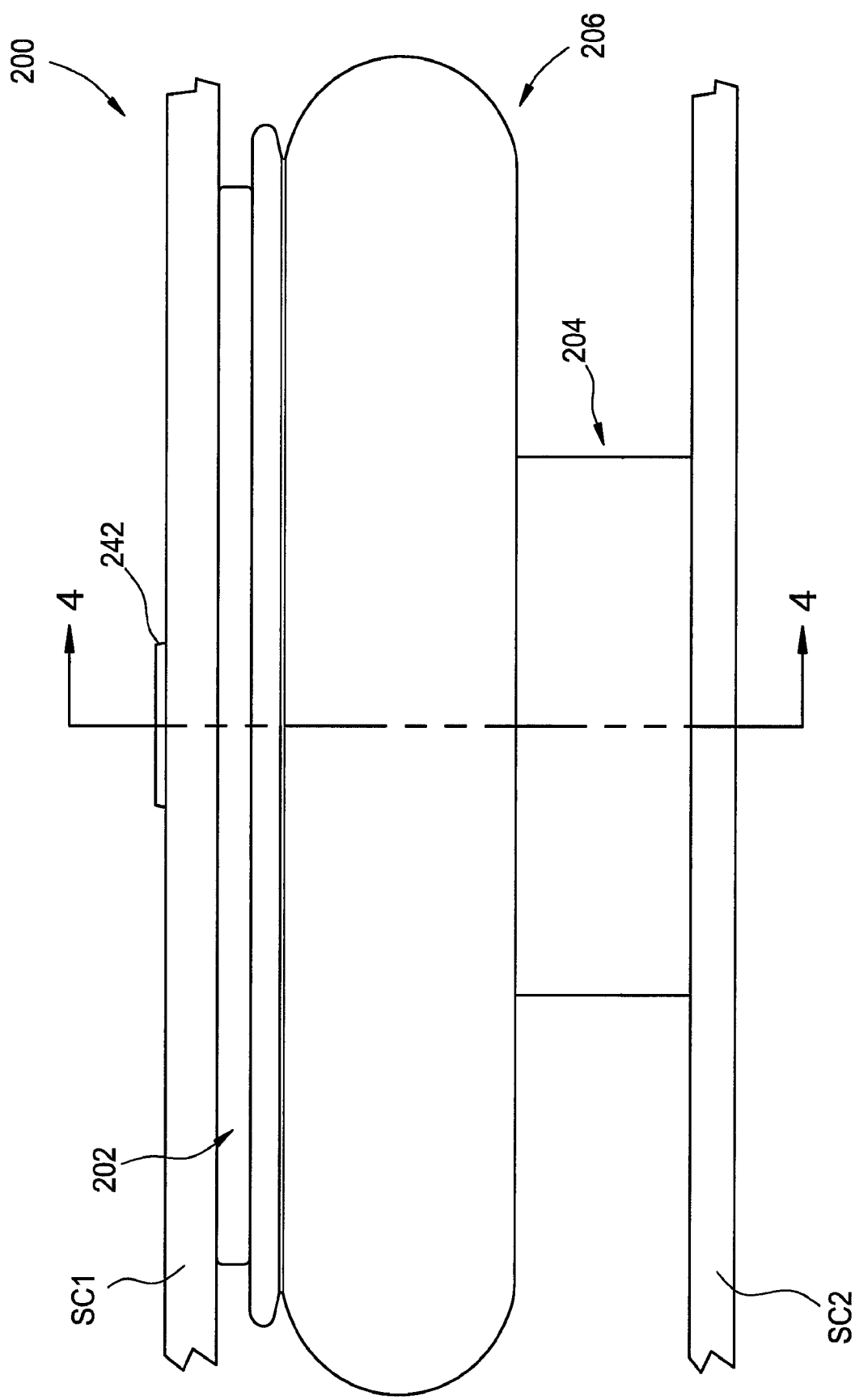
FIG. 3 is a side view of one example of a gas spring assembly including one example of a lateral support element in accordance with the subject matter of the present disclosure.

Regardless of the mounting arrangement that is used, gas spring assembly 200 includes a lateral support element in accordance with the subject matter of the present disclosure that is configured to engage a portion of flexible spring member 206 during lateral movement of end member 202 relative to end member 204. Additionally, the lateral support element can be adapted or otherwise configured to for securement on or along an end of the flexible spring member and/or a corresponding end member in a suitable manner. As an example of such lateral movement, end members 202 and 204 are shown in FIGS. 3 and 4 in an approximately coaxial or aligned condition. After undergoing lateral displacement, the end members are shown in FIG. 5 as being moved in a lateral direction into an offset or laterally-shifted condition, which is represented in FIG. 5 by reference arrows MVT.

It will be appreciated that a lateral support element in accordance with the subject matter of the present disclosure can be of any suitable size, shape, configuration and/or construction, and can be secured on or along one or more components of the gas spring assembly in any suitable manner. For example, lateral support elements 338 and 338' are respectively shown in FIGS. 3-6 and 7 in the form of endless, annular rings that extend peripherally about axis AX and radially between an inner peripheral edge 340 and an outer peripheral edge 342. As illustrated in the cross-sectional profile shown in FIGS. 3-6 and FIG. 7, lateral support elements 338 and 338' respectively include element walls 344 and 344'. As shown in FIGS. 3-6, element wall 344 at least partially forms an exterior surface 346 and also includes an inner surface 348 that at least partially defines an element chamber 350 within lateral support element 338. Similarly, as shown in FIG. 7, element wall 344' at least partially forms an exterior surface 346' and also includes an inner surface 348' that at least partially defines an element chamber 350' within lateral support element 338'.

Additionally, it will be appreciated that a lateral support element in accordance with the subject matter of the present disclosure can be formed from any suitable number of one or more elements and/or components, and can include any suitable number of one or more walls and/or wall portions. Furthermore, it will be appreciated that the one or more walls and/or wall portions can be formed from any suitable material or combination of materials, such as metal materials (e.g., steel, aluminum) and/or polymeric materials (e.g., polyethylene, polyurethane and/or polyamide).

Figure 6:
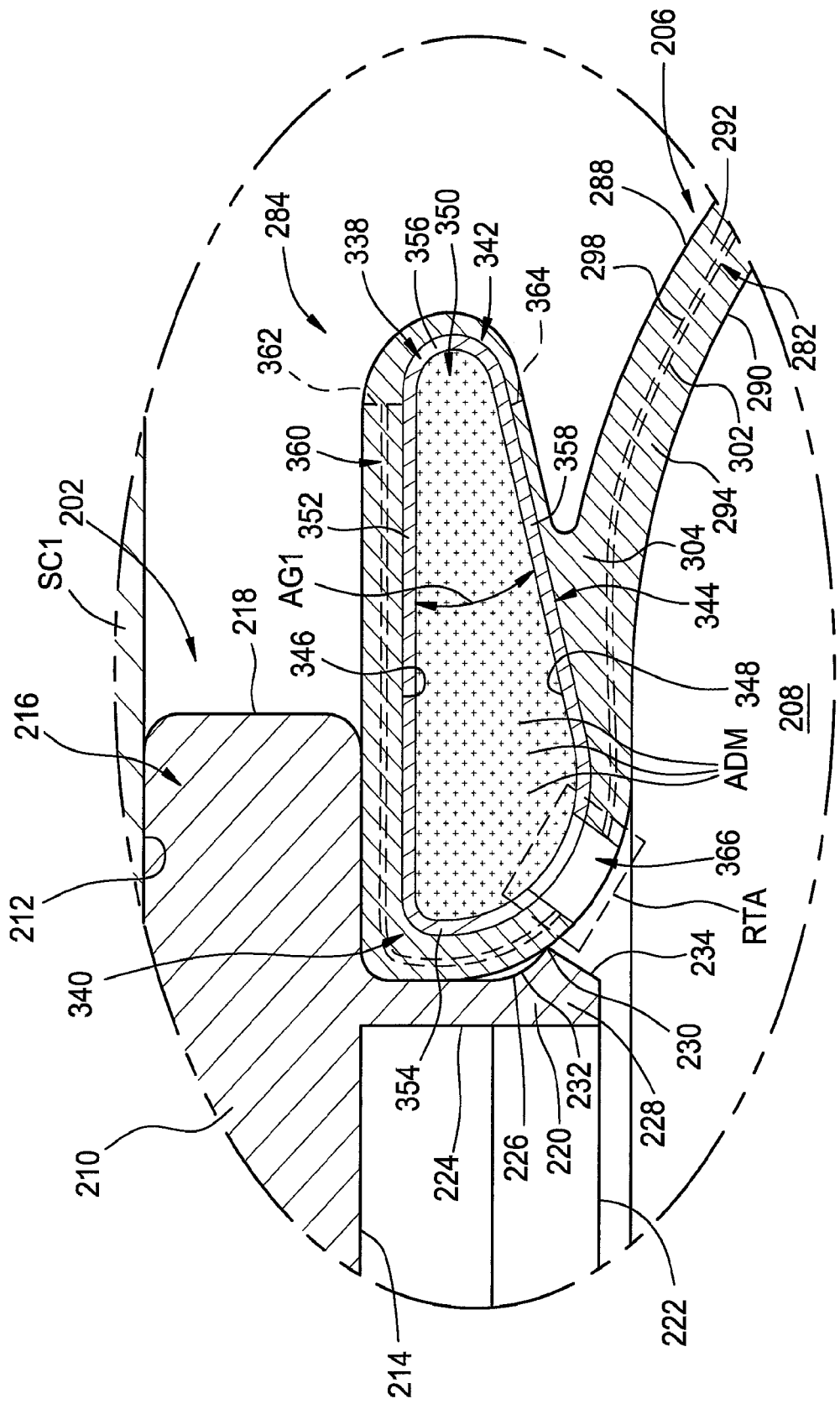
FIG. 6 is an enlarged view of the portion of the gas spring assembly and lateral support element in FIGS. 3-5 that is identified as Detail 6 in FIG. 4.

As identified in FIG. 6, for example, element wall 344 can include a base wall portion 352 that is disposed transverse to axis AX and extends in a generally radial direction. Element wall 344 can also include an inward wall portion 354 that can at least partially define inner peripheral edge 340, and an outward wall portion 356 that can at least partially define outer peripheral edge 342. Element wall 344 can further include a support wall portion 358 disposed in axially-spaced relation to base wall portion 352. Support wall portion 358 can extend between and operatively interconnect inward and outward wall portions 354 and 356 such that element chamber 350 is at least partially defined by wall portions 352-358. In the arrangement shown in FIGS. 3-6, support wall portion 358 has an approximately linear profile that is disposed at an acute angle relative to base wall portion 352, as is represented in FIG. 6 by reference dimension AG1. It will be appreciated that angle AG1 can have a value within any suitable range of values, such as a value within a range of from approximately three (3) degrees to approximately ninety-seven (97) degrees, for example. As such, it will be recognized and appreciated that the portion of exterior surface 346 along support wall portion 358 can have an approximately frustoconical overall shape.

Figure 7:
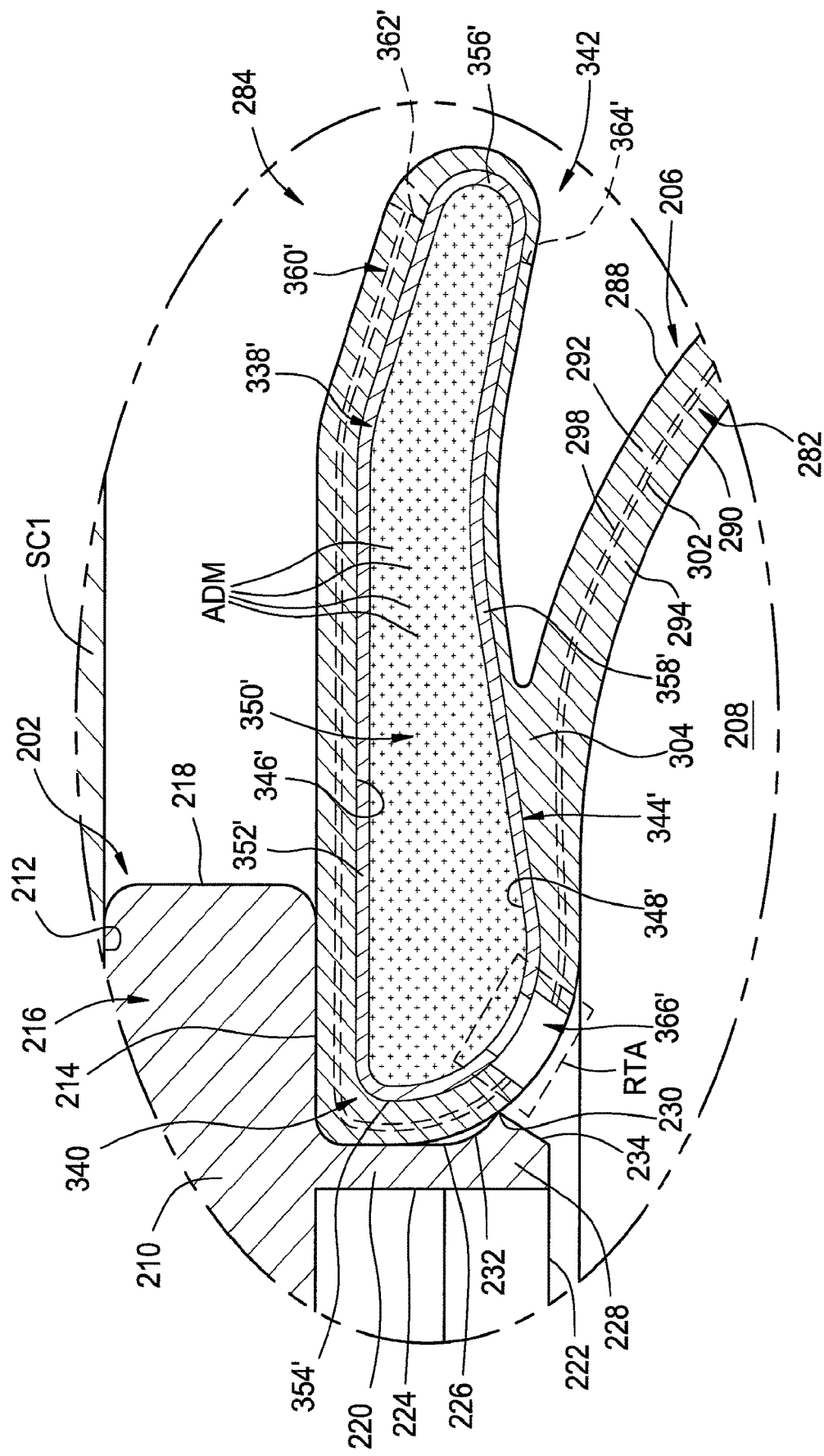
FIG. 7 is an enlarged view of a portion similar to that shown in FIG. 6 of another example of a gas spring assembly and lateral support element in accordance with the subject matter of the present disclosure.

As another example, element wall 344' is identified in FIG. 7 as including a base wall portion 352' that is disposed transverse to axis AX and extends in a generally radial direction. Element wall 344' also includes an inward wall portion 354' that can at least partially define inner peripheral edge 340, and an outward wall portion 356' that can at least partially define outer peripheral edge 342. Element wall 344' can further include a support wall portion 358' disposed in axially-spaced relation to base wall portion 352'. Support wall portion 358' can extend between and operatively interconnect inward and outward wall portions 354' and 356' such that element chamber 350' is at least partially defined by wall portions 352'-358'. Element wall 344' differs from element wall 344 at least in that support wall portion 358' has a curvilinear overall shape or profile in comparison with the approximately linear profile of support wall portion 358. As such, it will be appreciated that lateral support elements having support surfaces with cross-sectional profiles of a variety of shapes, sizes and configurations have been developed and are commonly used, such as may be suitable for contributing to certain lateral performance characteristics of a gas spring assembly, for example. As such, it will be appreciated that a support surface having a cross-sectional profile of any suitable size, shape and/or configuration could be used without departing from the subject matter of the present disclosure.

As discussed above, it will be appreciated that a lateral support element in accordance with the subject matter of the present disclosure can be operatively connected or otherwise associated with the flexible spring member of a gas spring assembly in any suitable manner. In some cases, the lateral support element can be provided and secured to the associated end member and/or other component separate and apart from securement of the flexible spring member. In other cases, the lateral support element and flexible spring member can be attached or otherwise interconnected to one another prior to assembly with an end member. In such cases, it will be appreciated that any suitable configuration and/or arrangement of features and/or elements can be used in operatively connecting the end of the flexible spring member and the lateral support element to one another. In a preferred arrangement, however, the flexible spring member and the lateral support element are permanently attached (i.e., inseparable without damage, destruction or material alteration of at least one of the component parts). It will be appreciated that such a permanent attachment can be formed by way of one or more processes and/or can include the use of one or more treatments and/or materials. Non-limiting examples of suitable processes can include molding, adhering, curing and/or vulcanizing.

As one example, a portion of one or more of the fabric-reinforced, elastomeric plies or layers and/or a portion of one or more of the un-reinforced, elastomeric plies or layers of the flexible wall can extend along and can be operatively attached, preferably permanently, to a lateral support element in accordance with the subject matter of the present disclosure. It will be appreciated that the portions of the one or more plies or layers can be attached to the lateral support element in any suitable manner, such as by one or more of molding, adhering, curing and/or vulcanizing, for example. In some cases, the one or more plies or layers of material can include an elastomeric material that can be permanently attached to the exterior surface of the lateral support element. In such cases, the one or more plies or layers of material can extend partially around or along the exterior surface of one or more portions of the element wall (e.g., one or more of wall portions 352-358 and/or 352'-358'). In some cases, one or more plies or layers of material can terminate at one or more annular edges. Additionally, or in the alternative, one or more plies or layers of material can extend around and substantially entirely encapsulate the lateral support element.

In the arrangements shown in FIGS. 4-7, for example, fabric-reinforced plies 298 and 302 extend partially around the cross-sectional profile of lateral support elements 344 and 344'. That is, the fabric-reinforced plies of flexible wall 282 extend along the exterior surface of inward wall portions 354/354' and base wall portions 352/352' and terminate at distal ends 360 and 360' adjacent outward wall portions 356/356'. Additionally, or in the alternative, one or more of the unreinforced, elastomeric plies or layers can extend at least partially around the cross-sectional profile of lateral support elements 344 and 344'. For example, in the arrangement shown in FIGS. 4-7, unreinforced, elastomeric material from one or more of plies 292 and/or 294 can extend around and along the exterior surface of wall portions 352-358 and 352'-358' such that lateral support elements 344 and 344' are substantially-entirely encapsulated by material from flexible wall 282. As alternate examples, unreinforced, elastomeric material from one or more of plies 292 and/or 294 can extend around and along the exterior surface of wall portions 352-358 and 352'-358', and terminate at one or more of edges 362/362' and 364/364' such that at least a portion of exterior surface 346/346' of the lateral support element remains exposed.

Element chambers 350 and 350' be of any suitable size, shape, configuration and/or arrangement. Generally, the cross-sectional shape and/or profile of the element chambers will be established by the size, shape and profile of element walls 344/344' and the wall portions thereof. As discussed above, lateral support elements 338 and 338' can have an annular configuration that extends substantially entirely about axis AX. In such cases, the element walls can define element chambers 350 and/or 350' that extend about axis AX in an endless, annular configuration. In other cases, one or more partition walls can extend across the element chambers to separate the element chambers into two or more chamber portions. In any case, element walls 344 and 344' respectively of lateral support elements 338 and 338' can, optionally, include one or more passages 366 and 366' extending therethrough, as are respectively shown in FIGS. 6 and 7. If provided, the one or more passages can permit fluid communication between spring chamber 208 and element chambers 350/350' and/or any chamber portions thereof.

It will be appreciated that passages 366 and 366' can be formed in any suitable manner. For example, passages 366 extend substantially uniformly through mounting bead 304 of flexible wall 282 and through element wall 344 of lateral support element 338. In such case, passages 366 could be drilled or otherwise formed through the flexible wall and the element wall after construction and curing of the flexible spring member and lateral support element into an assembly. As another example, passage 366' has one size extending through mounting bead 304 of flexible wall 282 and a reduced size extending through element wall 344'. In such cases, a hole could be provided through element wall 344' prior to construction with the flexible wall, and the flexible wall could include an opening that is separately provided or formed after construction.

Figure 8:
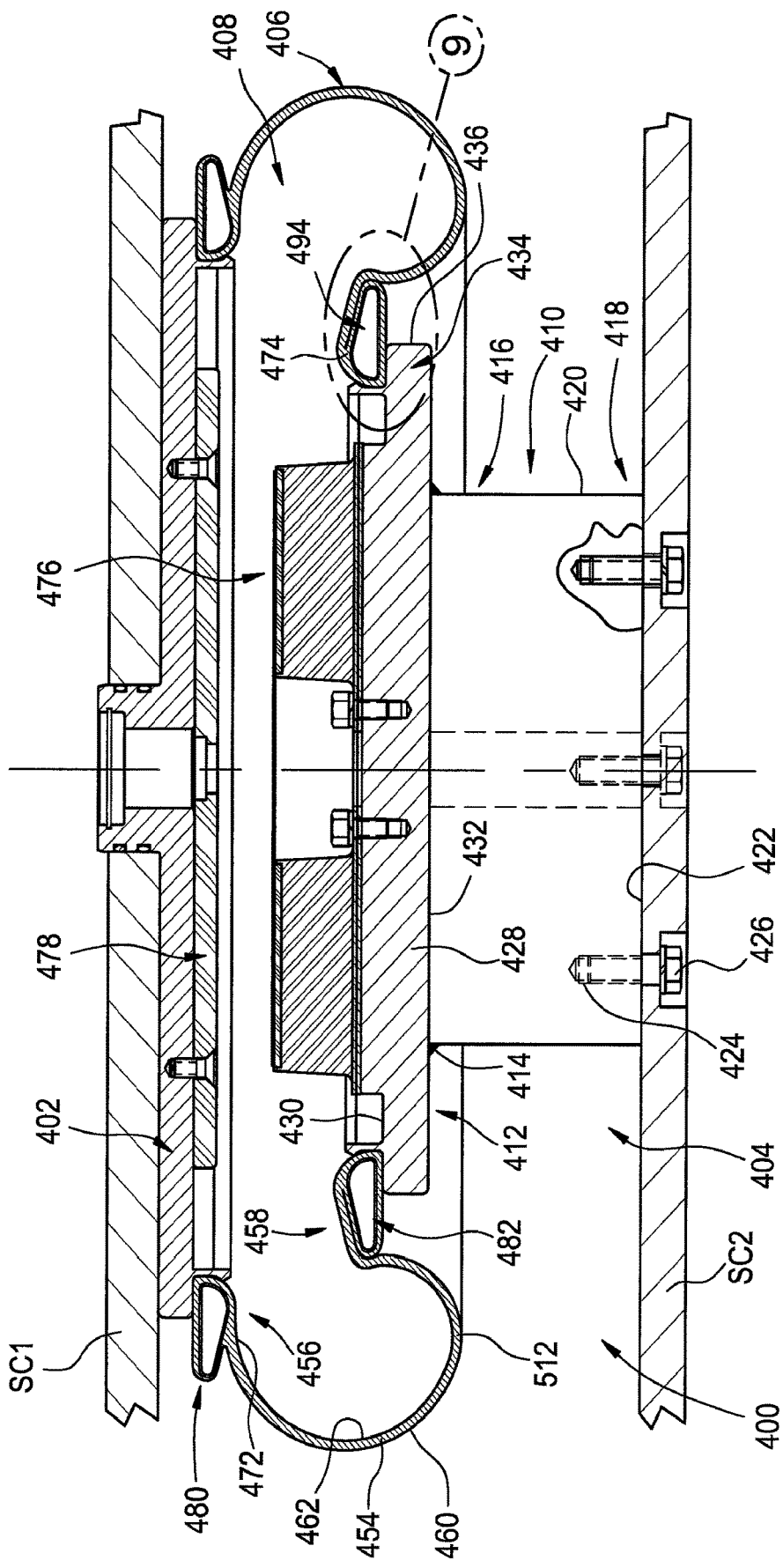
FIG. 8 is a cross-sectional side view of another example of a gas spring assembly in accordance with the subject matter of the present disclosure.
Figure 9:
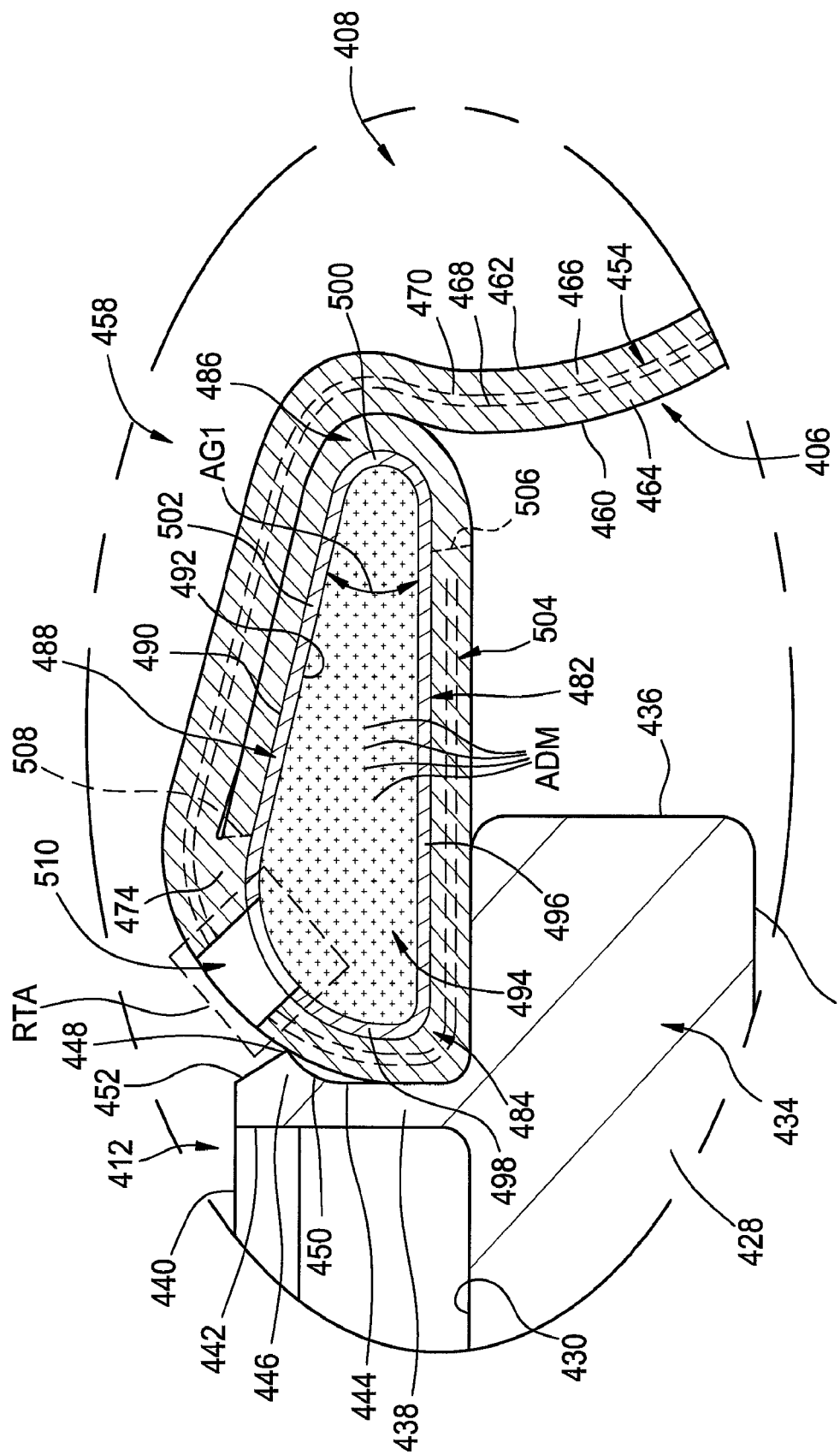
FIG. 9 is an enlarged view of the portion of the gas spring assembly and lateral support element in FIG. 8 that is identified as Detail 9 therein.
Figure 10:
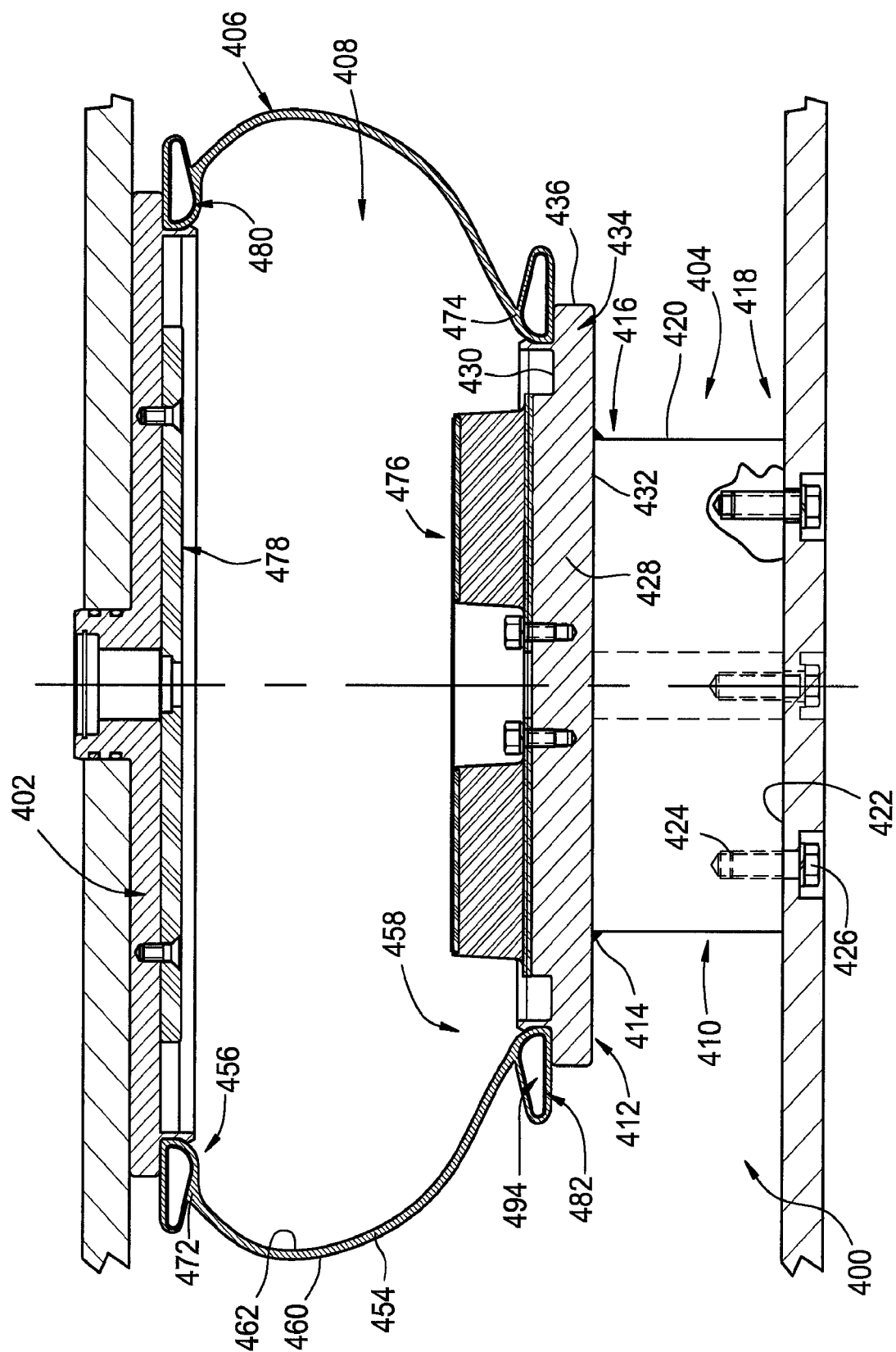
FIG. 10 illustrates the gas spring assembly in FIGS. 8 and 9 in an axially displaced condition.

Another example of a gas spring assembly in accordance with the subject matter of the present disclosure, such as may be suitable for use as one or more of gas spring assemblies 120 in FIGS. 1 and 2, for example, is shown as gas spring assembly 400 in FIGS. 8-10. The gas spring assembly has a longitudinal axis AX and includes an end member 402, an end member 404 spaced longitudinally from end member 402 and a flexible spring member or sleeve 406 that extends peripherally about the longitudinal axis and is secured between the end members to at least partially define a spring chamber 408.

Gas spring assembly 400 can be disposed between associated sprung and unsprung masses of an associated vehicle in any suitable manner. For example, one end member can be operatively connected to an associated sprung mass with the other end member disposed toward and operatively connected to the associated unsprung mass. In the arrangement shown in FIGS. 8 and 10, for example, end member 402 is secured on or along a structural component SC1, such as an associated vehicle body 102 in FIG. 1, for example, and can be secured thereon in any suitable manner. As another example, end member 404 is secured on or along a structural component SC2, such as an associated rail bogie 104 in FIG. 1, for example, and can be secured thereon in any suitable manner.

It will be appreciated that end member 402 is shown in FIGS. 8 and 10 as being substantially identical to end member 202, which is shown and described in detail in connection with FIGS. 3-7. As such, for purposes of brevity, a detailed description of end member 402 is not repeated here. It is to be recognized and understood, however, that the foregoing description of end member 202, including all of the features and functions thereof as well as any components that associated therewith, is equally applicable to end member 402 as if recited in full detail herein. Accordingly, it will be appreciated that the associated end of flexible spring member 406 and any associated lateral support element operatively engage end member 404 in a manner substantially identical to that shown and described above in connection with end member 202.

End member 404 is shown in FIGS. 8 and 10 as taking the form of an assembly that includes a support base or pedestal 410 and a base plate 412 that is secured on or along the pedestal in a suitable manner, such as by way of a flowed-material joint 414, for example. Pedestal 410 extends axially between opposing ends 416 and 418, and includes an outer surface 420 that extends peripherally about axis AX and an end surface 422 that is disposed along end 418 and is dimensioned or otherwise configured for operative engagement with an associated structural component, such as structural component SC2, for example. It will be appreciated that end member 404 can be secured on or along the associated structural component in any suitable manner. As one example, pedestal 410 can include a plurality of securement features 424, such as threaded passages that extend inwardly into the pedestal from along end surface 422, for example. In some cases, a corresponding number of one or more holes or passages HLS can extend through structural component SC2 that are dimensioned for receipt of a securement device 426, such as a threaded fastener, for example. It will be appreciated, however, that other configurations and/or arrangements could alternately be used.

Base plate 412 can have a plate wall 428 that has opposing surfaces 430 and 432 such that a plate height (not identified) is at least partially defined therebetween. Base plate 412 is shown as being generally planar and extending outwardly to an outer periphery 434. In some cases, base plate 412 can have a generally circular shape such that an outer peripheral surface 436 extending in a heightwise direction can have a generally cylindrical shape. End member 404 can also include a side wall 438 that extends peripherally about axis AX. In a preferred arrangement, side wall 438 can be disposed radially inward of outer periphery 434 and can project axially outward from along surface 430 of plate wall 428 to a distal edge 440. It will be appreciated that side wall 438 can be of any suitable size, shape, form and/or configuration. For example, as identified in FIG. 9, side wall 438 can include approximately cylindrical inner and outer surfaces 442 and 444. Alternately, the side wall can have one or more surfaces that are frustoconical, curvilinear and/or otherwise contoured. In a preferred arrangement, at least a portion of outer surface 444 and at least a portion of surface 430 of plate wall 428 can form a mounting seat (not numbered) that extends peripherally about axis AX. Additionally, in a preferred arrangement, outer surface 444 can be dimensioned to receive and form a substantially fluid-tight connection with an end of flexible spring member 406.

In some cases, a retainment ridge 446 can extend peripherally about axis AX and can project radially outward from side wall 438. As identified in FIG. 9, retainment ridge 446 can include an outermost edge 448, a shoulder surface 450 and an outer surface 452. In a preferred arrangement, shoulder surface 450 can extend peripherally around axis AX and radially outward from along outer surface 444 of side wall 438 to outermost edge 448. Additionally, shoulder surface 450 is disposed in facing relation to surface 430 of plate wall 428 and extends radially outwardly in generally transverse relation to side wall 438. While shoulder surface 450 is shown as being substantially continuous, it will be appreciated that a discontinuous or segmented arrangement could alternately be used in which a plurality of peripherally-spaced shoulder portions are provided. Outer surface 452 can, in some cases, extend between and operatively connect outermost edge 448 and distal edge 440. It will be appreciated, however, that other configurations and/or arrangements could alternately be used.

Flexible spring member 406 can be of any suitable size, shape, construction and/or configuration. As one example, flexible spring member 406 can include a flexible wall 454 that extends in a longitudinal direction between opposing ends 456 and 458. It will be appreciated that flexible spring member 406 and flexible wall 454 thereof can be formed in any suitable manner and from any suitable material or combination of materials. For example, flexible spring member 406 and flexible wall 454 can be of a substantially identical construction shown and described above in connection with flexible spring member 206 and flexible wall 282 of FIGS. 3-7. As such, for purposes of brevity, a detailed description of flexible spring member 406 and flexible wall 454 is not repeated here. It is to be recognized and understood, however, that the foregoing description of flexible spring member 206, including all of the features and functions thereof as well as any components that associated therewith, is equally applicable to flexible spring member 406 as if recited in full detail herein.

As shown in FIGS. 8-10, flexible wall 454 can include an outer surface 460 and an inner surface 462, which can at least partially define spring chamber 408. Additionally, as identified in FIGS. 8-10, flexible wall 454 can include an outer or cover ply 464 that at least partially forms outer surface 460 and an inner or liner ply 466 that at least partially forms inner surface 462. In a preferred arrangement, flexible wall 454 can also include one or more reinforcing plies 468 and 470 that are disposed between outer and inner surfaces 460 and 462, and include a plurality of filament segments (not shown) such as have been described above in connection with reinforcing plies 298 and 302, for example.

In some cases, flexible wall 454 can, optionally, include a mounting bead dispose along either one or both of ends 456 and 458. In the arrangement shown in FIGS. 8-10, mounting beads 472 and 474 are shown as being respectively disposed along ends 456 and 458. In some cases, one or more of the mounting beads can, optionally, include a reinforcing element (not shown), such as an endless, annular bead core, for example, that is at least partially embedded therein and is substantially inextensible in comparison with at least one or more materials of flexible wall 454. Alternately, one or more bead retaining features can be formed on or along another component of the gas spring assembly. It will be appreciated, that the ends of flexible spring member 406 can be secured on, along or otherwise interconnected between end members 402 and 404 in any suitable manner. For example, gas spring assembly 400 can include mounting beads 472 and 474 in operative engagement with end members 402 and 404 such that substantially fluid-tight joints are respectively formed therebetween. For example, in some cases, mounting bead 472 could be received and retained along the mounting seat (e.g., the feature formed between surfaces 212 and 226) of end member 402. Additionally, or in the alternative, mounting bead 474 could be received and retained along the mounting seat formed between surfaces 430 and 444 of end member 404.

As is well known in the art, it is generally desirable to avoid or at least minimize contact between end members of a gas spring assembly, such as may occur due to variations in load conditions and/or upon deflation of the gas spring assembly, for example. As such, gas spring assembly 400 is shown in FIGS. 8 and 10 as including a jounce bumper 476 that is disposed within spring chamber 408 and supported on end member 404. Additionally, gas spring assembly 400 is shown as including a bearing plate 478 that is disposed within spring chamber 408 and supported on end member 402 generally opposite jounce bumper 476. It will be appreciated that jounce bumper 476 and bearing plate 478 are substantially identical to jounce bumper 320 and bearing plate 332, which are shown and described in detail in connection with FIGS. 4 and 5. As such, for purposes of brevity, detailed descriptions of jounce bumper 476 and bearing plate 478 are not repeated here. It is to be recognized and understood, however, that the foregoing description of jounce bumper 320 and bearing plate 332, including all of the features and functions thereof as well as any components that associated therewith, is equally applicable to jounce bumper 476 and bearing plate 478 as if recited in full detail herein.

As discussed above, it will be appreciated that the ends of flexible spring member 406 can be secured on or along or be otherwise interconnected between end members 402 and 404 in any suitable manner. In some cases, the gas spring assembly can include a bead retaining element that engages at least a portion of one end of the flexible spring member and maintains the end of the flexible spring member in substantially fluid-tight engagement with the corresponding end member. For example, it will be appreciated that end member 402 and flexible spring member 406 could be operatively connected to one another by way of a conventional mounting bead and bead retaining element, such as has been described above in connection with mounting bead 306, bead retaining element 310 and end member 204 of FIGS. 4 and 5, for example. As another example, mounting bead 472 can be dimensioned to abuttingly engage an outer surface of a side wall of end member 402 such that a substantially fluid-tight seal can be formed therebetween, such as has been described above in connection with mounting bead 304 and side wall 220, for example. Additionally, in some cases, gas spring assembly 400 can include a lateral support element 480 in accordance with the subject matter of the present disclosure operatively associated with flexible spring member 406 and end member 402, such as has been described above in detail in connection with end member 202, flexible spring member 206 and lateral support elements 338 and 338'.

It will be appreciated that lateral support element 480 is shown in FIGS. 8 and 10 as being substantially identical to lateral support element 338 and substantially similar to lateral support element 338', which are shown and described in detail in connection with FIGS. 3-7. As such, for purposes of brevity, a detailed description of lateral support element 480 is not repeated here. It is to be recognized and understood, however, that the foregoing description of lateral support elements 338 and 338', including all of the features and functions thereof as well as any components that are associated therewith, is equally applicable to lateral support element 480 as if recited in full detail herein.

As a further alternative, end 458 of flexible spring member 406 can be dimensioned for receipt and retention on or along side wall 438. In the arrangement shown in FIGS. 8-10, for example, mounting bead 474 is dimensioned to abuttingly engage outer surface 444 of side wall 438 such that a substantially fluid-tight seal can be formed therebetween. It will be appreciated that end 458 can be assembled onto end member 404 in any suitable manner. As one example, end 458 can be position adjacent distal edge 440 of side wall 438 and/or outer surface 452 of retainment ridge 446. End 458 of the flexible spring member can then be urged, pressed or otherwise forced over the retainment ridge and into abutting engagement with one or more of surface 430 of plate wall 428 and/or outer surface 444 of side wall 438.

In some cases, the flexible spring member can include an annular reinforcing element, such as a bead core 308 in mounting bead 306 of flexible spring member 206, for example, that can be at least partially embedded within an end or mounting bead of the flexible spring member. In such cases, a lateral support element in accordance with the subject matter of the present disclosure can be provided separately from the flexible spring member, and can be secured on or along the end member and/or the flexible wall in a suitable manner, which can be separate and apart from the securement of the end of the flexible spring member on or along the end member.

In other cases, such as is shown in FIGS. 8-10, for example, gas spring assembly 400 can include a lateral support element that is operatively associated with flexible spring member 406 and at least one of end members 402 and 404. In such cases, the lateral support element can function as both a substantially-inextensible reinforcing element for a mounting bead of the flexible spring member as well as a structural feature for supporting, engaging or otherwise influencing the flexible spring member as the gas spring assembly undergoes lateral displacement (i.e., movement of the opposing end members relative to one another in a direction transverse to axis AX).

Regardless of the mounting arrangement that is used, gas spring assembly 400 includes at least one lateral support element in accordance with the subject matter of the present disclosure that is configured to engage a portion of flexible spring member 406 during lateral movement of end members 402 and 404 relative to one another. As an example of such lateral movement, end members 402 and 404 are shown in FIGS. 8 and 10 in an approximately coaxial or aligned condition. After undergoing lateral displacement, the end members are moved relative to one another in opposing lateral directions and into an offset or laterally-shifted condition, such as is represented in FIG. 4 by reference arrows MVT in connection with gas spring assembly 200.

It will be appreciated that a lateral support element in accordance with the subject matter of the present disclosure can be of any suitable size, shape, configuration and/or construction, and can be secured on or along one or more components of the gas spring assembly in any suitable manner. For example, a lateral support element 482 can be disposed along end 458 of flexible spring member 406. The lateral support element can take the form of an endless, annular ring that extends peripherally about axis AX and radially between an inner peripheral edge 484 and an outer peripheral edge 486. As illustrated in the cross-sectional profile shown in FIGS. 8-10, lateral support element 482 includes an element wall 488. As identified in FIG. 9, element wall 488 at least partially forms an exterior surface 490 and also includes an inner surface 492 that at least partially defines an element chamber 494 within lateral support element 482.

As discussed above, it will be appreciated that a lateral support element in accordance with the subject matter of the present disclosure can be formed from any suitable number of one or more elements and/or components, and can include any suitable number of one or more walls and/or wall portions. Furthermore, it will be appreciated that the one or more walls and/or wall portions can be formed from any suitable material or combination of materials, such as metal materials (e.g., steel, aluminum) and/or polymeric materials (e.g., polyethylene, polyurethane and/or polyamide).

As identified in FIG. 9, for example, element wall 488 can include a base wall portion 496 that is disposed transverse to axis AX and extends in a generally radial direction. Element wall 488 can also include an inward wall portion 498 that can at least partially define inner peripheral edge 484, and an outward wall portion 500 that can at least partially define outer peripheral edge 486. Element wall 488 can further include a support wall portion 502 disposed in axially-spaced relation to base wall portion 496. Support wall portion 502 can extend between and operatively interconnect inward and outward wall portions 498 and 500 such that element chamber 494 is at least partially defined by wall portions 496-502. In the arrangement shown in FIGS. 8-10, support wall portion 502 has an approximately linear profile that is disposed at an acute angle relative to base wall portion 496, as is represented in FIG. 9 by reference dimension AG1. It will be appreciated that angle AG1 can have a value within any suitable range of values, such as a value within a range of from approximately three (3) degrees to approximately ninety-seven (97) degrees, for example. As such, it will be recognized and appreciated that the portion of exterior surface 490 along support wall portion 502 can have an approximately frustoconical overall shape.

As such, it will be appreciated that lateral support elements having support surfaces with cross-sectional profiles of a variety of shapes, sizes and configurations have been developed and are commonly used, such as may be suitable for contributing to certain lateral performance characteristics of a gas spring assembly, for example. Accordingly, it will be appreciated that a support surface having a cross-sectional profile of any suitable size, shape and/or configuration could be used without departing from the subject matter of the present disclosure.

As discussed above, it will be appreciated that a lateral support element in accordance with the subject matter of the present disclosure can be operatively connected or otherwise associated with the flexible spring member of a gas spring assembly in any suitable manner. In some cases, the lateral support element can be provided and secured to the associated end member and/or other component separate and apart from securement of the flexible spring member. In other cases, the lateral support element and flexible spring member can be attached or otherwise interconnected to one another prior to assembly with an end member. In such cases, it will be appreciated that any suitable configuration and/or arrangement of features and/or elements can be used in operatively connecting the end of the flexible spring member and the lateral support element to one another. In a preferred arrangement, however, the flexible spring member and the lateral support element are permanently attached (i.e., inseparable without damage, destruction or material alteration of at least one of the component parts). It will be appreciated that such a permanent attachment can be formed by way of one or more processes and/or can include the use of one or more treatments and/or materials. Non-limiting examples of suitable processes can include molding, adhering, curing and/or vulcanizing.

As one example, a portion of one or more of the fabric-reinforced, elastomeric plies or layers and/or a portion of one or more of the un-reinforced, elastomeric plies or layers of the flexible wall can extend along and can be operatively attached, preferably permanently, to a lateral support element in accordance with the subject matter of the present disclosure. It will be appreciated that the portions of the one or more plies or layers can be attached to the lateral support element in any suitable manner, such as by one or more of molding, adhering, curing and/or vulcanizing, for example. In some cases, the one or more plies or layers of material can include an elastomeric material that can be permanently attached to the exterior surface of the lateral support element. In such cases, the one or more plies or layers of material can extend partially around or along the exterior surface of one or more portions of the element wall (e.g., one or more of wall portions 496-502). In some cases, one or more plies or layers of material can terminate at one or more annular edges. Additionally, or in the alternative, one or more plies or layers of material can extend around and substantially entirely encapsulate the lateral support element.

In the arrangements shown in FIGS. 8-10, for example, fabric-reinforced plies 468 and 470 extend partially around the cross-sectional profile of lateral support element 482. That is, the fabric-reinforced plies of flexible wall 454 extend along the exterior surface of inward wall portion 498 and base wall portions 496, and terminate at a distal end 504 adjacent outward wall portion 500. Additionally, or in the alternative, one or more of the unreinforced, elastomeric plies or layers can extend at least partially around the cross-sectional profile of lateral support element 482. For example, in the arrangement shown in FIGS. 8-10, unreinforced, elastomeric material from one or more of plies 464 and/or 466 can extend around and along the exterior surface of wall portions 496-502 such that lateral support element 482 is substantially-entirely encapsulated by material from flexible wall 454. As an alternate example, unreinforced, elastomeric material from one or more of plies 464 and/or 466 can extend around and along the exterior surface of wall portions 496-502 and terminate at one or more of edges 506 and 508 such that at least a portion of exterior surface 490 of lateral support element 482 remains exposed.

Element chamber 494 can be of any suitable size, shape, configuration and/or arrangement. Generally, the cross-sectional shape and/or profile of the element chambers will be established by the size, shape and profile of element wall 488 and the wall portions thereof. As discussed above, lateral support element 482 can have an annular configuration that extends substantially entirely about axis AX. In such cases, the element wall can define element chamber 494 that extends about axis AX in an endless, annular configuration. In other cases, one or more partition walls (not shown) can extend across the element chambers to separate the element chambers into two or more chamber portions (not shown). In any case, element wall 488 of lateral support element 482 can, optionally, include one or more passages 510 extending therethrough, such as is shown in FIG. 9, for example. If provided, the one or more passages can permit fluid communication between spring chamber 408 and element chamber 494 and/or any chamber portions thereof.

Typically, at least a portion of flexible spring member 406 will extend radially outward beyond outer periphery 434 of base plate 412 as well as radially outward beyond outer peripheral edge 486 of lateral support element 482. In such cases, a rolling lobe 512 can be formed along the flexible spring member, and rolling lobe 512 can be displaceable relative to one or more features of end member 404 as the gas spring assembly is axially displaced between extended and compressed conditions, such as may occur during dynamic use in operation.

In preferred arrangement of gas spring assemblies in accordance with the subject matter of the present disclosure, passages 366, 366' and/or 510 can place element chambers 350, 350' and/or 494 in fluid communication with spring chamber 208 and/or 408 in a manner that will be useful for improving or otherwise altering the performance of gas spring assembly 200 and/or 400. For example, it is understood that the spring rate of a gas spring assembly can be varied by increasing or decreasing the volume of pressurized gas operatively associated with the spring chamber of the gas spring assembly. By placing one of element chambers 350, 350' and/or 494 in fluid communication with spring chamber 208 or 408 a reduced spring rate of gas spring assemblies 200 and/or 400 can be achieved. In such a construction, passages 366, 366' and/or 510 are preferably of sufficient size and/or quantity to permit the element chamber and the spring chamber to function as a substantially contiguous volume of pressurized gas.

Additionally, or in the alternative, passages 366, 366' and/or 510 can be configured to generate pressurized gas damping by allowing pressurized gas transfer between one or more of the element chambers and the spring chamber under certain conditions of use of gas spring assemblies 200 and/or 400. In such cases, passages 366 and/or 366' can be of a size, shape and quantity that will permit pressurized gas transfer between spring chamber 208 and/or 408 and one or more of element chambers 350, 350' and/or 494 in a manner that dissipates kinetic energy acting on gas spring assemblies 200 and/or 400.

Furthermore, it has been recognized that certain adsorptive materials disposed within a chamber or cavity can cause the chamber or cavity to store an increased volume of pressurized gas. In some cases, gas spring assemblies in accordance with the subject matter of the present disclosure, such as gas spring assemblies 200 and/or 400, for example, can, optionally, include a quantity of adsorptive material disposed within one or more of the lateral support elements thereof. For example, lateral support elements 338, 338' and 482 are respectively shown in FIGS. 6, 7 and 9 as including a quantity of adsorptive material ADM disposed element chambers 350, 350' and/or 494 as well as in the element chamber of lateral support element 480, which is substantially similar to lateral support element 338, as discussed above.

It will be appreciated that adsorptive material ADM can be of any suitable type, kind and/or composition. In a preferred arrangement, adsorptive material ADM can take the form of a loose packed, granular and/or flowable material. As one example of a suitable material, activated carbon in powdered, granular or bead form with particles having a size of less than approximately one (1) millimeter could be used. It will be appreciated, however, that other adsorptive materials could alternately be used.

In an assembled condition, the element chamber of one or more lateral support elements can be substantially entirely filled with a quantity of adsorptive material ADM. In some cases, a quantity of adsorptive material could be contained in one or more fabric sleeves that can be installed within the element chamber prior to completion of the lateral support elements (e.g., prior to final welding of the element wall into an annular ring). Alternately, the quantity of adsorptive material could be filled into the element chamber and suitable retaining devices and/or assemblies can be secured on or along the lateral support elements and extend across the passages in communication with the element chambers to retain adsorptive material ADM within the lateral support elements. In a preferred arrangement, the retaining devices and/or assemblies can at least slightly compress or otherwise compact adsorptive material ADM such that shifting, settling and/or other relative movement of the adsorptive material within the element chamber can be minimized or at least reduced. That is, in a preferred arrangement, the retaining devices and/or assemblies can maintain the material in at least a loosely packed condition and preferably in a firmly packed condition while minimizing crushing or other pressure-induced damage to the adsorptive material. It will be appreciated that such retaining devices and/or assemblies can be of any suitable type, kind and/or construction, and are schematically represented in FIGS. 6, 7 and 9 by boxes RTA.

Figure 11:
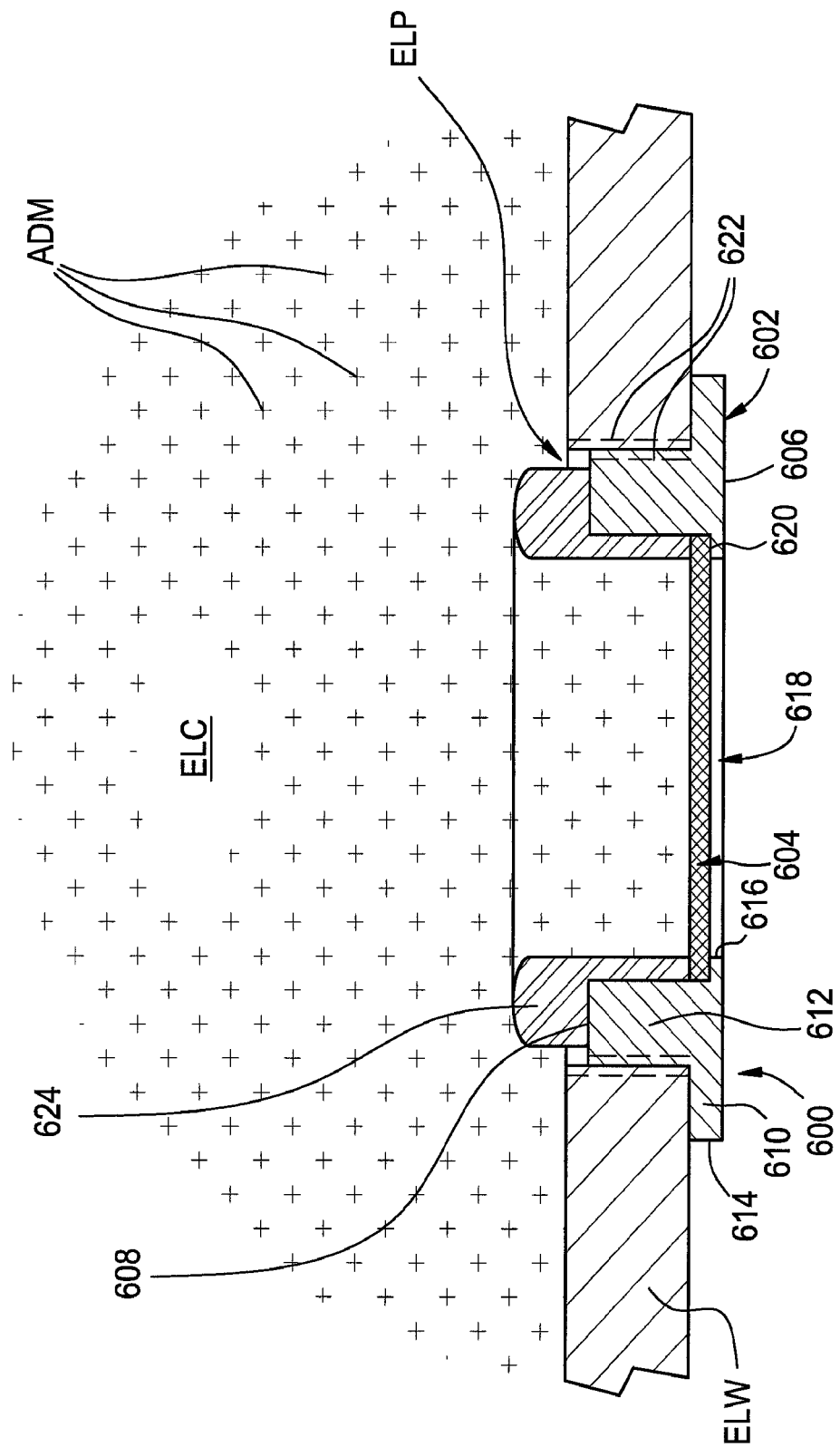
FIG. 11 is an enlarged cross-sectional view of one example of a retainer assembly secured across a passage of a lateral support element.
Figure 12:
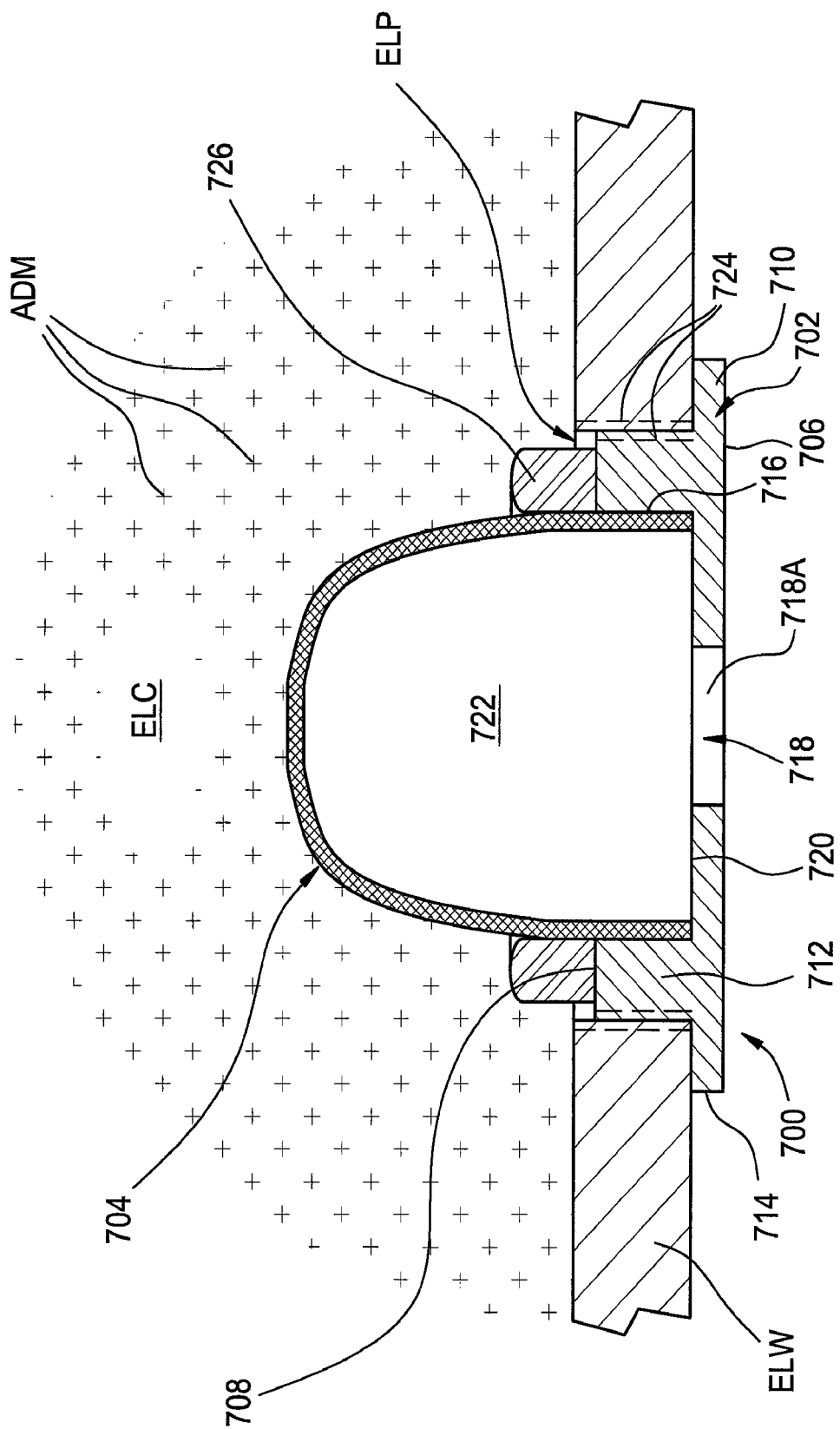
FIG. 12 is an enlarged cross-sectional view of another example of a retainer assembly secured across a passage of a lateral support element.

FIGS. 11 and 12 illustrate features and elements of a lateral support element and, as such, are representative of portions of lateral support elements 338, 338', 480 and 482. The constructions in FIGS. 11 and 12 are shown as including an element wall ELW that is representative of at least element walls 344, 344' and 488. Element wall ELW at least partially defines an element chamber ELC that is representative of element chambers 350, 350' and 494. Element wall ELW has an opening or passage ELP extending therethrough in fluid communication with the element chamber that is representative of passages 366, 366' and 510.

One example of a retaining device or assembly suitable for use as retaining assemblies RTA in FIGS. 6, 7 and 9 that is securable across an opening or passage of a lateral support element to retain adsorptive material in the element chamber thereof is shown in FIG. 11 as retaining assembly 600. As discussed above, it will be recognized and appreciated that one or more of retaining assemblies 600 can be secured on, along or otherwise across any one or more passages of one or more of lateral support elements 338, 338', 480 and/or 482. Retaining assembly 600 is shown as including a retainer body 602 dimensioned for securement on or along element wall ELW and a filter element 604 that is dimensioned to extend at least partially across passage ELP. Retainer body 602 is shown as including end surfaces 606 and 608 as well as a flange wall portion 610 that at least partially defines end surface 606 and a side wall portion 612 that extends from along flange wall portion 610 toward end surface 608. Retainer body 602 also includes an outer surface 614 that extends between end surfaces 606 and 608 along flange wall portion 610 and outer side wall portion 612. And, retainer body 602 includes an inner surface 616 that at least partially defines a passage 618 that extends through the retainer body. In a preferred arrangement, passage 618 can be sized, shaped and/or otherwise configured to permit element chamber ELC and the associated spring chamber (e.g., one of spring chambers 208 and 408) to act as a substantially contiguous volume. Inner surface 616 can at least partially define a recess or seat surface 620 dimensioned to receive filter element 604. It will be appreciated that filter element 604 can be secured on or along seat surface 620 in any suitable manner, such as by way of a press-fit connection, an adhesive or other flowed-material joint, or by one or more mechanical fasteners (e.g., retaining rings or threaded fasteners).

Filter element 604 is preferably formed from a material or combination of materials having a suitable screen size to substantially inhibit passage of adsorptive material ADM from passing out of element chamber ELC (i.e., out of element chambers 350, 350' and/or 494). In some cases, a porous metal filter, a fabric filter or a combination of filter materials can be used. It will be appreciated that retaining assembly 600 can be secured on or along element wall ELW of the associated lateral support element (i.e., one of lateral support elements 338, 338', 480 and 482) in any suitable manner. For example, retainer body can be operatively connected or otherwise secured to element wall ELW by way of one or more securement features, such as are represented in FIG. 11 by dashed lines 622. Examples of suitable securement features can include interference-fit connections, threaded connections, adhesive or other flowed-material joints and/or mechanical fasteners.

As discussed above, in an installed condition, retaining assembly 600 preferably maintain the adsorptive material in at least a loosely packed condition and, more preferably, in a firmly packed condition while minimizing crushing or other pressure-induced damage to the adsorptive material. As such, retaining assembly 600 can optionally include a compressive element 624 that is supported on retainer body 602 and is disposed at least partially within element chamber ELC. Compressive element 624, if included, can be formed from any suitable material or combination of materials. For example, in some cases, compressive element 624 could be formed from an elastomeric material, such as natural rubber, synthetic rubber and/or thermoplastic elastomer. In some cases, compressive element 624 can be sufficiently compliant so as to compress or otherwise deflect during the assembly process. In some cases, a closed-cell polyurethane foam and/or closed-cell foam rubber could be used. In this manner, compressive element 624 could apply a biasing to adsorptive material ADM and thereby at least partially maintain the material in at least a loosely packed condition. Again, if used, the biasing pressure of compressive element 624 will preferably be sufficiently high so as to maintain adsorptive material ADM in a firmly packed condition that minimizes or at least reduces settling and movement of the material within element chamber ELC while having a biasing pressure that is sufficiently low so as to minimize crushing or other pressure-induced damage to the adsorptive material.

Another example of a retaining device or assembly suitable for use as retaining assemblies RTA in FIGS. 6, 7 and 9 that is securable across an opening or passage of a lateral support element to retain adsorptive material in the element chamber thereof is shown in FIG. 12 as retaining assembly 700. As discussed above, it will be recognized and appreciated that one or more of retaining assemblies 700 can be secured on, along or otherwise across any one or more passages of one or more of lateral support elements 338, 338', 480 and/or 482. Retaining assembly 700 is shown as including a retainer body 702 dimensioned for securement on or along element wall ELW and a filter element 704 that is dimensioned to extend at least partially across passage ELP. Retainer body 702 is shown as including end surfaces 706 and 708 as well as a flange wall portion 710 that at least partially defines end surface 706 and a side wall portion 712 that extends from along flange wall portion 710 toward end surface 708. Retainer body 702 also includes an outer surface 714 that extends between end surfaces 706 and 708 along flange wall portion 710 and outer side wall portion 712. And, retainer body 702 includes an inner surface 716 that at least partially defines a passage 718 that extends through the retainer body. In a preferred arrangement, passage 718 can include an orifice portion 718A that is sized, shaped and/or otherwise configured to generate pressurized gas damping as pressurized gas transfers between element chamber ELC and the associated spring chamber (e.g., one of spring chambers 208 and 408). Inner surface 716 can at least partially define a recess or seat surface 720 dimensioned to receive filter element 704. It will be appreciated that filter element 704 can be secured on or along seat surface 720 in any suitable manner, such as by way of a press-fit connection, an adhesive or other flowed-material joint, or by one or more mechanical fasteners (e.g., retaining rings or threaded fasteners).

Filter element 704 is preferably formed from a material or combination of materials having a suitable screen size to substantially inhibit passage of adsorptive material ADM from passing out of element chamber ELC (i.e., out of element chambers 350, 350' and/or 494). Filter element 704 differs from filter element 604 in that filter element 704 extends away from seat surface 720 to at least partially define a filter recess 722 within retainer body 702 that is in fluid communication with orifice portion 718A of passage 718. In some cases, a porous metal filter, a fabric filter or a combination of filter materials can be used. It will be appreciated that retaining assembly 700 can be secured on or along element wall ELW of the associated lateral support element (i.e., one of lateral support elements 338, 338', 480 and 482) in any suitable manner. For example, retainer body can be operatively connected or otherwise secured to element wall ELW by way of one or more securement features, such as are represented in FIG. 12 by dashed lines 724. Examples of suitable securement features can include interference-fit connections, threaded connections, adhesive or other flowed-material joints and/or mechanical fasteners.

As discussed above, in an installed condition, retaining assembly 700 preferably maintain the adsorptive material in at least a loosely packed condition and, more preferably, in a firmly packed condition while minimizing crushing or other pressure-induced damage to the adsorptive material. As such, retaining assembly 600 can optionally include a compressive element 726 that is supported on retainer body 702 and is disposed at least partially within element chamber ELC. Compressive element 726, if included, can be formed from any suitable material or combination of materials. For example, in some cases, compressive element 726 could be formed from an elastomeric material, such as natural rubber, synthetic rubber and/or thermoplastic elastomer. In some cases, compressive element 726 can be sufficiently compliant so as to compress or otherwise deflect during the assembly process. In some cases, a closed-cell polyurethane foam and/or closed-cell foam rubber could be used. In this manner, compressive element 726 could apply a biasing to adsorptive material ADM and thereby at least partially maintain the material in at least a loosely packed condition. Again, if used, the biasing pressure of compressive element 726 will preferably be sufficiently high so as to maintain adsorptive material ADM in a firmly packed condition that minimizes or at least reduces settling and movement of the material within element chamber ELC while having a biasing pressure that is sufficiently low so as to minimize crushing or other pressure-induced damage to the adsorptive material.

Figure 13:
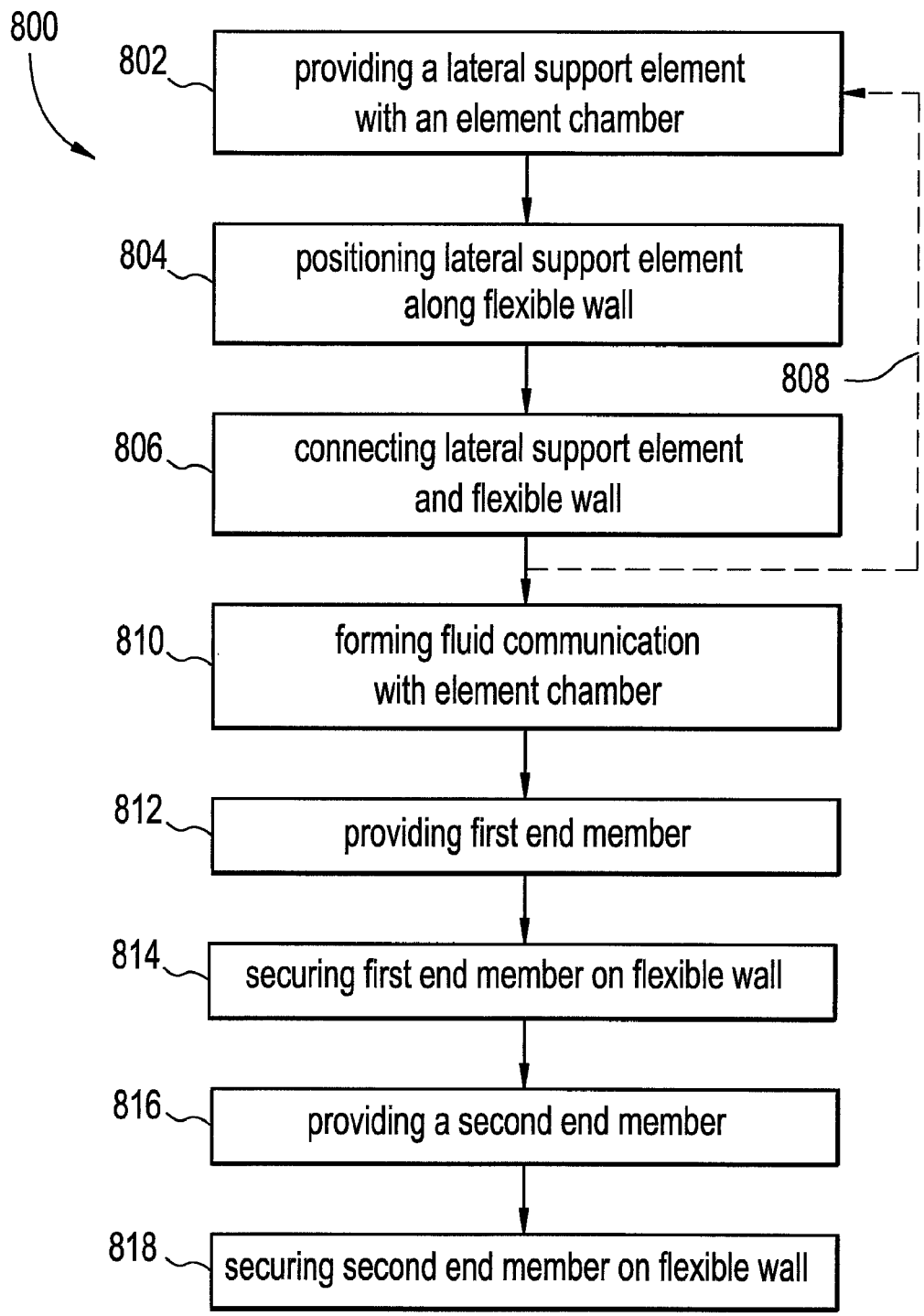
FIG. 13 is a graphical representation of one example of a method of manufacturing a gas spring assembly in accordance with the subject matter of the present disclosure.

One example of a method 800 of manufacturing a gas spring assembly in accordance with the subject matter of the present disclosure, such as one of gas spring assemblies 120, 200 and/or 400, for example, is shown in FIG. 13 as including providing a lateral support element (e.g., one of lateral support elements 344, 344', 480 and 482) that includes an element chamber (e.g., element chamber 350, 350', 494) as is represented in FIG. 13 by item number 802. Method 800 also includes positioning the lateral support element on or along a portion of a flexible wall (e.g., flexible wall 282 and 454) preferably in a green or otherwise uncured state, as is represented by item number 804. Method 800 can further include permanently attaching the lateral support element and the flexible wall, such as by molding, adhering, curing and/or vulcanizing, for example, as is represented by item number 806. In cases in which more than one lateral support element in accordance with the subject matter of the present disclosure (e.g., more than one of lateral support elements 344, 344', 480 and 482) is used, method 800 can include repeating actions 802-806, as is represented in FIG. 13 by arrow 808. Method 800 can also, optionally, include forming a communication passage (e.g., one or more of communication passages 366, 366' and 510) with one or more of the element chambers, as is represented in FIG. 13 by item number 810.

Method 800 can also include providing a first end member, such as one of end members 202, 204, 402 and 404, for example, as is represented by item number 812. Method 800 can further include securing the first end member on or along an end of the flexible wall to at least partially form a spring chamber, such as one of spring chambers 208 and 408, for example, as is represented in FIG. 13 by item number 814. Method 800 can also include providing a second end member, such as a different one of end members 202, 204, 402 and 404, for example, as is represented by item number 816. Method 800 can further include securing the second end member on or along an end of the flexible wall to at least partially form a spring chamber, such as one of spring chambers 208 and 408, for example, as is represented in FIG. 13 by item number 818.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly having a longitudinal axis and comprising:
   an end member;
   a flexible wall extending peripherally about said longitudinal axis between a first end and a second end spaced longitudinally from said first end, said flexible wall including an inner surface and an outer surface with said inner surface at least partially defining a spring chamber; and,
   a lateral support element including an element wall having a cross-sectional profile with an exterior surface and an interior surface at least partially defining an element chamber within said lateral support element;
   said flexible wall extending at least partially around said cross-sectional profile of said element wall and permanently attached along said exterior surface thereof such that a portion of said lateral support element is encapsulated by said flexible wall with some of said flexible wall along said first end thereof disposed between said end member and said lateral support element.

2. A gas spring assembly according to claim 1 further comprising a quantity of adsorptive material disposed within said element chamber of said lateral support element.

3. A gas spring assembly according to claim 2, wherein said lateral support element includes a passage extending through said element wall in fluid communication with said element chamber, and said gas spring assembly further comprises a retaining assembly secured across said passage that is operative to retain said quantity of adsorptive material within said element chamber.

4. A gas spring assembly according to claim 3, wherein said retaining assembly includes a retainer body secured along said element wall, a filter element extending at least partially across said passage and supported on said retainer body, and a compressive element disposed in abutting engagement with said quantity of adsorptive material and operative to maintain said quantity of adsorptive material in a packed condition that at least partially reduces settling and movement of the material within said element chamber.

5. A gas spring assembly according to claim 2, wherein said quantity of adsorptive material includes activated carbon particles having a particle size of less than approximately one (1) millimeter.

6. A gas spring assembly according to claim 1, wherein said gas spring assembly is laterally displaceable between a neutral position and a laterally-offset position such that in said neutral position said second end of said flexible wall and said lateral support element are disposed approximately coaxial alignment with one another and in said laterally-offset position said second end of said flexible wall and said lateral support element are disposed in laterally-spaced apart relation to one another.

7. A gas spring assembly according to claim 6, wherein a portion of an annular area of said outer surface of said flexible wall is disposed in abutting engagement with a portion of an annular area of said exterior surface of said lateral support element and the remaining portion of said annular area of said outer surface of said flexible wall is disposed in spaced relation to the remaining portion of said annular area of said second surface of said lateral support element in said laterally-offset position.

8. A gas spring assembly according to claim 1, wherein said element wall includes at least three wall portions, and said flexible wall extends around said cross-sectional profile of said element wall along at least two of said at least three wall portions.

9. A gas spring assembly according to claim 8, wherein said flexible spring wall includes at least one layer of fabric-reinforced material with said at least one layer of fabric-reinforced material extending around said cross-sectional profile of said element wall along said at least two of said at least three wall portions.

10. A gas spring assembly according to claim 1, wherein said flexible wall extends substantially-entirely around said cross-sectional profile of said element and substantially-entirely around the periphery of said lateral support element such that said lateral support element is substantially-entirely encapsulated by said flexible wall.

11. A gas spring assembly according to claim 10, wherein said cross-sectional profile of said element wall includes at least three wall portions, and said flexible wall includes at least one layer of unreinforced, elastomeric material with said at least one layer of unreinforced, elastomeric material extending along each of said at least three wall portions.

12. A gas spring assembly according to claim 1, wherein a passage extends in fluid communication between said element chamber and said spring chamber such that pressurized gas transfers therebetween.

13. A gas spring assembly according to claim 1, wherein said end member is a first end member, and said gas spring assembly further comprises a second end member secured across said second end of said flexible wall such that said spring chamber is at least partially defined by said flexible wall between said first and second end members.

14. A suspension system comprising:
 a pressurized gas system that includes a pressurized gas source and a control device; and,
 at least one gas spring assembly according to claim 1, said at least one gas spring assembly disposed in fluid communication with said pressurized gas source through said control device such that pressurized gas can be selectively transferred into and out of at least said spring chamber of said at least one gas spring assembly.

15. A gas spring assembly according to claim 1, wherein said flexible wall terminates at one or more edges such that a portion of said lateral support element remains outwardly exposed by said flexible wall.

16. A method of assembling a gas spring assembly, said method comprising:
 providing a lateral support element having an element wall with an exterior surface and an interior surface that at least partially defines an element chamber within said lateral support element;
 providing a flexible wall having a longitudinal axis and extending peripherally about said longitudinal axis between first and second ends to at least partially form a spring chamber;
 extending a portion of said flexible wall around said lateral support element and permanently attaching said portion of said flexible wall to said exterior surface said element wall thereby encapsulating at least a portion of said lateral support element;
 providing an end member; and,
 securing said lateral support element and said first end of said flexible wall to said end member with at least a portion of said flexible wall along said first end disposed between said first end member and said lateral support element such that a substantially fluid-tight connection is formed therebetween.

17. A method according to claim 16, wherein extending said portion of said flexible wall around said lateral support element includes embedding substantially all of said lateral support element within said flexible wall.

18. A method according to claim 16 further comprising operatively connecting said element chamber with said spring chamber such that pressurized gas transfer can transfer therebetween.

19. A gas spring assembly comprising:
 a flexible wall having a longitudinal axis and extending peripherally about said longitudinal axis between a first end and a second end spaced longitudinally from said first end, said flexible wall including an inner surface and an outer surface with said inner surface at least partially defining a spring chamber; and,
 a lateral support element including an element wall with an exterior surface and an interior surface that at least partially defines an element chamber;
 a portion of said flexible wall extending around said lateral support element and permanently attached along said exterior surface said element wall such that said lateral support element is at least partially embedded within said flexible wall.

20. A gas spring assembly according to claim 19, wherein a passage in fluid communication between said element chamber and said spring chamber extends through said element wall and said flexible wall.

* * * * *